United States Patent
Zeidman et al.

(10) Patent No.: US 12,309,045 B2
(45) Date of Patent: May 20, 2025

(54) DATA-DRIVEN, RISK AND ACTIVITY-BASED DYNAMIC AUDIT APPLICATION AND METHOD

(71) Applicant: American Institute of Certified Public Accountants, Durham, NC (US)

(72) Inventors: Harold Irving Zeidman, Fountain Hills, AZ (US); Tammy Lynn Suber Mooney, Lakeside, TX (US); Karl Joseph Busch, Concord Township, OH (US); Amy Renee Pawlicki, Morristown, NJ (US); James Matthew Young, Jr., Ballwin, MO (US); Karen Chrosniak Larsen, Coudersport, PA (US); Christopher Travis Webb, Denver, CO (US); Jennifer Jean Wood, Rochester, NY (US); George Herrmann, Stamford, CT (US); Jessica Elizabeth Estrella, Ocean, NJ (US); Steven Edward Morrison, Hollywood, FL (US)

(73) Assignee: American Institute of Certified Public Accountants, Durham, NC (US)

( * ) Notice: Subject to any disclaimer, the term of this patent is extended or adjusted under 35 U.S.C. 154(b) by 168 days.

(21) Appl. No.: 18/082,033

(22) Filed: Dec. 15, 2022

(65) Prior Publication Data

US 2023/0188438 A1 Jun. 15, 2023

Related U.S. Application Data

(60) Provisional application No. 63/289,845, filed on Dec. 15, 2021.

(51) Int. Cl.
*H04L 43/06* (2022.01)

(52) U.S. Cl.
CPC .................. *H04L 43/06* (2013.01)

(58) Field of Classification Search
CPC ........................................ H04L 43/06
USPC ........................................ 709/224
See application file for complete search history.

(56) References Cited

U.S. PATENT DOCUMENTS

| | | | |
|---|---|---|---|
| 2005/0222929 A1* | 10/2005 | Steier | G06Q 40/00 705/35 |
| 2006/0106686 A1 | 5/2006 | King et al. | |
| 2009/0113324 A1 | 4/2009 | Spradling et al. | |
| 2012/0259752 A1* | 10/2012 | Agee | G06Q 40/00 705/35 |

(Continued)

OTHER PUBLICATIONS

International Searching Authority, International Application No. PCT/US22/52983, PCT Notification of International Search Report and Written Opinion, Mar. 22, 2023, pp. 1-10.

*Primary Examiner* — James E Springer
(74) *Attorney, Agent, or Firm* — Hunton Andrews Kurth LLP

(57) ABSTRACT

An embodiment of the present invention is directed to a Dynamic Audit Solution (DAS) that provides and enables a transformative audit methodology that uses data, embedded knowledge and advanced technologies to help inform auditor judgment through the selection of relevant procedures at the appropriate time. The Dynamic Audit Solution improves overall quality and value through a modernized audit approach that leverages technology, data and knowledge to create and support the execution of an effective and efficient methodology.

22 Claims, 14 Drawing Sheets

(56) References Cited

U.S. PATENT DOCUMENTS

2021/0019837 A1    1/2021  Watson
2024/0095637 A1*   3/2024  Holovacs ........... G06Q 10/0635

* cited by examiner

DATA-DRIVEN, RISK AND ACTIVITY-BASED DYNAMIC AUDIT APPLICATION AND METHOD

CROSS REFERENCE TO RELATED APPLICATIONS

The application claims priority to U.S. Provisional Application No. 63/289,845, filed Dec. 15, 2021, the contents of which are incorporated herein in their entirety.

FIELD OF THE INVENTION

The invention relates generally to a system and method for implementing a data-driven, risk and activity-based dynamic application that may be applied to various engagements, including financial statement audits, attestation engagements and business process quality determinations.

BACKGROUND OF THE INVENTION

Traditional financial statement audit tools are linear in nature and often start from a baseline of prior year decisions and findings. While some traditional audits may structure and digitize client data for use when performing various automated audit procedures, the audit procedures themselves are not digitized and structured which leads to significant inefficiencies and limitations and increases the potential for inaccuracies. Financial statement audit tools leave the selection of audit procedures and when to perform them to auditor judgment determinations which can vary thereby resulting in inconsistencies.

Current tools offer limited flexibility and built-in audit process intelligence. As a result, they fail to promote quality and consistency in the audit process and also fail to realize efficiencies in the overall audit process that result from a flexible audit tool that incorporates audit process intelligence. For example, current systems are inherently limited to conditions that tool designers can anticipate and build into the tool in a link-chain hardwired approach. As a result, procedures are not dynamically linked but are user-determined, generally outside of the tool, based on documentation required by audit standards.

With current audit approaches, procedures are connected in a pre-determined link chain format. In addition, "basic" or "most common" procedures are developed because they need to apply broadly to as many circumstances as possible. Limited procedure options address the lowest common denominator and often lead to inefficient and ineffective procedures. Additional guidance may be provided, however, it is applied idiosyncratically. Moreover, only predetermined possible outcomes can be addressed within current systems.

These and other drawbacks exist.

SUMMARY OF THE INVENTION

According to an embodiment, the invention relates to a system that implements a data-driven, risk and activity-based dynamic audit application. The system comprises: an interface that communicates with one or more users via a communication network; an Activity Database that stores and manages one or more Activities wherein each Activity comprises an Input, an Action and an Output; a Documentation Database that stores and manages client data, external data and previous output data wherein the Documentation Database and the Activity Database are linked in a manner where the Input of the Activity is based on data from the Documentation Database and the Output of the Activity is used to update the Documentation Database; a Risk/Response Library Database that stores and manages standard risks, risk groups, risk responses and control objectives; and a computer processor coupled to the interface, the Activity Database and the Documentation Database, the Risk/Response Library Database and further configured to perform the steps of: performing an initial action that generates a corresponding one or more outputs wherein the initial action is part of an audit engagement; based on the corresponding one or more outputs, dynamically generating a set of activity options; for each activity option, determining a score that represents a relative ranking against other activity options; from the set of activity options and based at least in part on the score, identifying an optimal activity; performing a next action that comprises the optimal activity; generating a set of procedures specific to the audit engagement; and presenting one or more risk indicators within the Risk/Response Library Database using the output of one or more specific actions performed to assist the auditor in identifying one or more relevant risks.

According to another embodiment, the invention relates to a method that implements a data-driven, risk and activity-based dynamic audit application. The method comprises the steps of: storing and managing, via an Activity Database, one or more Activities wherein each Activity comprises an Input, an Action and an Output; storing and managing, via a Documentation Database, client data, external data and previous output data wherein the Documentation Database and the Activity Database are linked in a manner where the Input of the Activity is based on data from the Documentation Database and the Output of the Activity is used to update the Documentation Database; storing and managing, via a Risk/Response Library Database, standard risks, risk groups, risk responses and control objectives; performing, via a computer processor, an initial action that generates a corresponding one or more outputs wherein the initial action is part of an audit engagement; based on the corresponding one or more outputs, dynamically generating, via the computer processor, a set of activity options; for each activity option, determining, via a scoring engine, a score that represents a relative ranking against other activity options; from the set of activity options and based at least in part on the score, identifying, via the computer processor, an optimal activity; performing, via the computer processor, a next action that comprises the optimal activity; generating, via the computer processor, a set of procedures specific to the audit engagement; and presenting, via the computer processor, one or more risk indicators within the Risk/Response Library Database using the output of one or more specific actions performed to assist the auditor in identifying one or more relevant risks.

The system and method may use a specially programmed computer system comprising one or more computer processors, interactive interfaces, electronic storage devices, and networks. The computer implemented system, method and medium described herein provide unique benefits and advantages to users or entities, according to various embodiments of the invention. In addition, the various embodiments of the present invention address the issues with current systems.

An embodiment of the present invention is directed to transforming the audit process through an activity-based, data-driven workflow that helps to inform auditor judgment through the suggestion of relevant risks and procedures at the appropriate time. An embodiment of the present invention provides a data-driven, risk-driven process that may be executed across various audits from the largest and most complex to the most basic. With auditor access to at least trial balance and general ledger data and auditor understanding of the entity's environment, an embodiment of the present invention yields gains in terms of efficiency (e.g., helping to identify and focus on relevant risks from beginning to end) and quality (e.g., through a guided approach—driven by both client data and engagement data/auditor knowledge, that helps support auditor judgment in identifying relevant risks and selecting relevant procedures at the appropriate time in the unique context of any given audit).

According to an embodiment of the present invention, key characteristics may include the following: fully integrated toolset that enables and brings the methodology to life; data analytics from start to finish integrated into the execution/workflow; data-driven, risk-based and tailor-in as opposed to "Same as Last Year", "checklist-based", "canned" or "tailor-out" traditional approaches—eliminates unnecessary work and instead focuses efforts on the most relevant risks. An embodiment of the present invention provides a methodology founded on the identification, assessment and response to relevant risks at the individual risk (as opposed to just assertion or financial statement level risks which tend to address multiple distinct individual risks without the ability to critically analyze each individual risk and demonstrate that the response to each such risk is appropriate and therefore cannot be effectively and demonstrably linked to appropriate procedures/analytics). An embodiment of the present invention leverages both client data and auditor knowledge to drive suggestion engines through the use of risk indicators that help inform the identification of relevant risks and selection of relevant procedures at the appropriate time. The ability to leverage auditor knowledge in the data structure is founded in the activities-based approach, which also enables the use of artificial intelligence and machine-learning on both client data and auditor knowledge to further refine suggestion engine capabilities. The innovative data structure also supports scoring of risks, procedures and evidence through scoring engines. The Activities-based approach moves away from a traditional documentation-based approach to one where documentation is a natural outcome of conducting activities rather than the focus of the audit. An embodiment of the present invention supports a workflow that is iterative not linear, and consistently addresses unexpected audit results and addresses preparer and reviewer/supervisor needs and perspectives.

An embodiment of the present invention provides an ability to facilitate data integration through Application Processing Interfaces (APIs) to support data ingestion and export, and integration of data analytics and ultimately machine learning capabilities throughout the workflow. Instead of making decisions and conducting procedures outside the tool, procedure decision determinations and automated procedure operations may be conducted within the tool, analytics are embedded in the risk-driven methodology and workflow so that data is identifying relevant risks from the beginning of the audit, and analytics are suggested to respond to relevant risks throughout the workflow.

By using both client data and auditor knowledge embedded in the tool (enabled through the unique activities-based approach) to identify relevant risks through the use of risk indicators at the risk level and then enabling the suggestion of appropriate procedures to respond to those risks, an embodiment of the present invention focuses on relevant audit matters and eliminates the unnecessary work inherent in checklist-based, "Same As Last Year" approaches.

The innovative application data structure enables the use of artificial intelligence and machine learning in various embodiments to further identify and refine the suggestion of relevant risks and appropriate procedures in real-time as the auditor proceeds through the audit—so artificial intelligence and machine learning in this context may be applied not only to client data to identify anomalies or relationships not intuitive to humans, but also to engagement data/auditor knowledge to refine and amplify the power of suggestion engines.

In contrast to current systems, an embodiment of the present invention permits the dynamic building of procedures that is dependent upon the results of the previous procedure, rather than being based upon a pre-determined set of procedures connected in a link-chain approach that may not be responsive to actual results as they are obtained.

In addition, an embodiment of the present invention enables the use of AI and Scoring to facilitate the dynamic building of an evidence-based chain unique to each specific set of facts and circumstances.

An embodiment of the present invention is directed to a dynamic audit solution that provides dynamic, real-time determinations based on Activities, which include an auditor Action, Inputs to the auditor Action and Outputs from the auditor Action. The Outputs may serve as Inputs to potential subsequent Activities.

By using Activities and linking those Activities to a Documentation Database that is updated with the results (Output) of each Activity, an embodiment of the present invention provides the dynamic building of procedures that is dependent upon the results of the previous procedure, rather than being based upon a pre-determined set of procedures connected in a link-chain approach that either is not responsive to actual results as they are obtained or a set of procedure choices limited to predetermined "if-then" conditions written into the tool which may not be responsive to actual audit needs.

In addition, an embodiment of the present invention permits the use of Artificial Intelligence (AI)/Machine Learning (ML) and/or a Scoring Engine(s) to facilitate the dynamic building of an evidence-based chain unique to each specific set of facts and circumstances.

The innovative dynamic audit solution is directed to relating evidence-needed to evidence-provided by potential procedures, determining which of those procedures to perform, when it is best to perform the procedures and evaluating the results of those procedures against the evidence needed.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
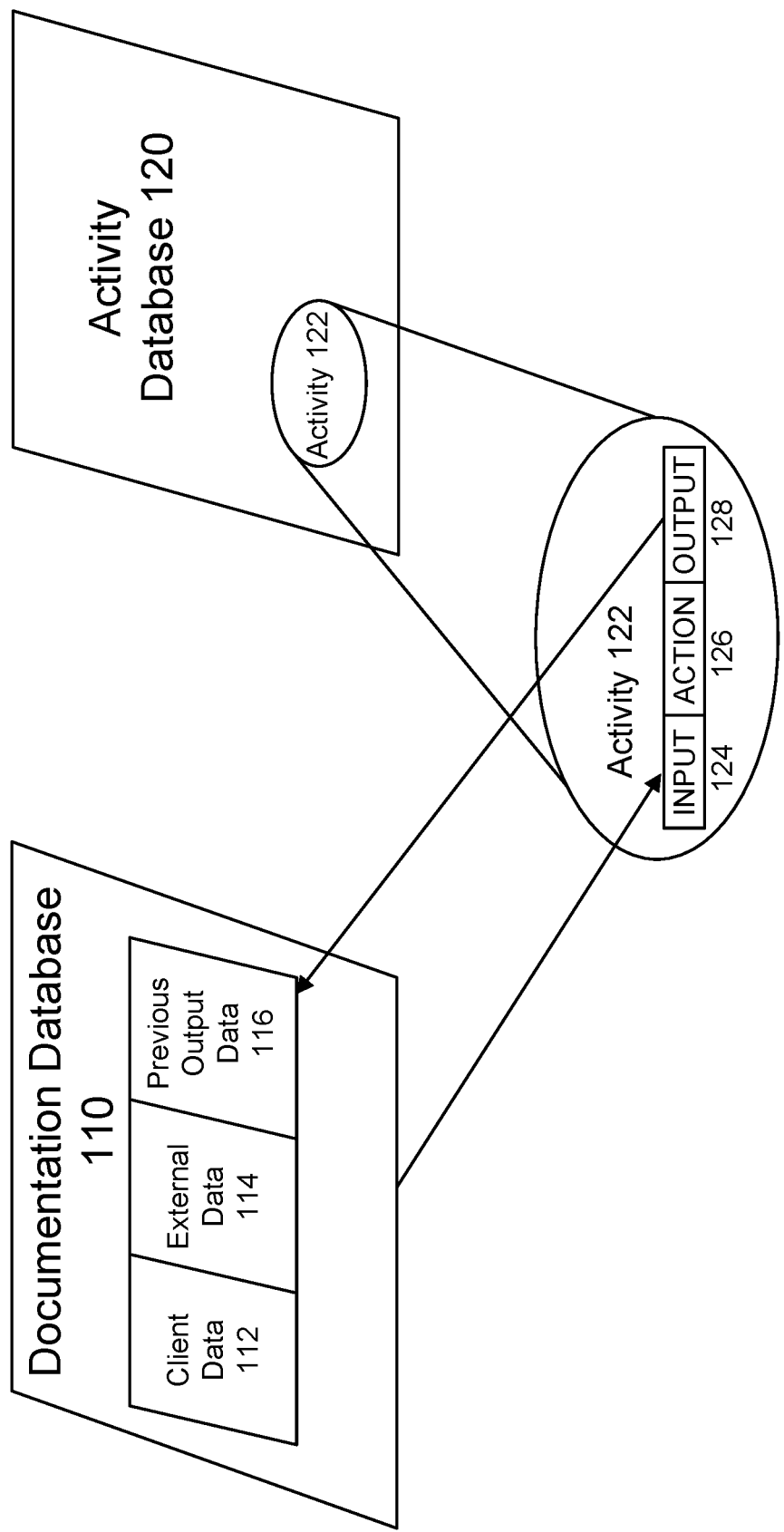
FIG. 1 is an exemplary diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Dynamic Audit Solution (DAS) that implements a data-driven approach to plan, perform, and conclude based on a dynamic, real-time determination of each auditor action by evaluating the audit results obtained thus far.

This dynamic, real-time determination is based upon Activities, which include an auditor Action, Inputs to that auditor Action and Outputs from that Action. The Outputs may serve as Inputs to potential subsequent Activities. By evaluating the audit status after an Output is obtained, an embodiment of the present invention determines an optimum subsequent Activity, including selecting from among those Activities which use Outputs already obtained as Inputs. The optimum subsequent Activity may vary from audit to audit based on a dynamic evaluation of audit data when the Output is obtained. This provides a real-time dynamic audit that automatically accounts for both unexpected audit results and the receipt of other information not anticipated when planning the audit. In addition, the dynamic evaluation may be further enhanced by applying Artificial Intelligence (AI)/Machine Learning (ML) aided by a Scoring Engine.

To enable the data-driven, Activities-based approach, an embodiment of the present invention not only structures and digitizes client information and audit results (which serve as Inputs and Outputs, via a Documentation Database) but also structures and digitizes Activities (via an Activity Database), including auditor Actions. This digitization and structuring of both traditional audit data (e.g., Inputs and Outputs) as well as unique audit data (e.g., Actions) enables the innovative real-time dynamic audit approach.

The real-time dynamic audit may be achieved by relating the structured information to appropriate potential auditor Actions using the relational database for Activities that may be evaluated manually and/or with AI/ML and scoring to further assist the auditor to dynamically determine relevant Activities to be performed to complete an audit and the order in which to perform those Activities.

For example, after each Activity is completed and the Outputs are obtained, the audit results may be identified and incorporated into a real-time audit evaluation process. An embodiment of the present invention provides unique and innovative interfaces (e.g., Inputs, Outputs and the use of Activities to update the Documentation Database) between the Documentation Database and the Activity Database.

An embodiment of the present invention may use audit specific AI and scoring to determine Activities to perform to identify and assess risks, respond to, and conclude on those risks, and complete other audit standards requirements. The AI and scoring may further drive the auditor to obtain sufficient appropriate audit evidence to support the audit report and dynamically rank potential next Activities designed to achieve that evidence by score (or other indicator/metric) to inform auditor judgments.

Current audit tools focus on the needs of the tool's initial user (the preparer) with certain predetermined screens available to assist others on the audit team, such as those who review or supervise the preparer's work (e.g., partners and managers) or are responsible for their firm's audit quality (e.g., those in the firm's risk management function). By structuring and digitizing Activities, the Activities themselves become data amenable to manipulation. As a result, an embodiment of the present invention may use preparer Activities as part of an expanded documentation database that may then dynamically drive higher order Activities for use by those in other audit roles, such as reviewers and supervisors. These higher order Activities in turn become data amenable to even higher order Activities in the Dynamic Audit Solution Tool that are useful for other purposes, such as firm quality control review.

With an embodiment of the present invention, audit procedures may be structured and digitized around Activities which may include an Input, Auditor Action and Output. As audit results are obtained, an embodiment of the present invention recommends subsequent audit procedures in real-time based on those audit results. This is provided through a Documentation Database and an Activity Database that interact with each other.

With an embodiment of the present invention, various user types (e.g., lower order users, higher order users, etc.) may be accommodated by using dynamically determined actions from Activity Databases specific to the type of user. Activities may be selected from these databases by combining the lower order user Activity Databases and the lower order Documentation Databases into one higher order Documentation Database. Other database structures, architectures and implementations may be supported. The dynamic selection process may operate in a manner consistent with the dynamic audit procedure selection process for lower order users.

In addition, unique AI and scoring engines for each user type may be implemented to enhance dynamic decision determinations as well as other considerations.

While the examples are specific to audits, an embodiment of the present invention may be applied to various engagements generally. An embodiment of the present invention represents a specific approach applicable whenever a user or entity seeks to perform procedures on data to obtain evidence to determine an optimal approach to arriving at a conclusion about the information presented, given a defined set of parameters, from among a structured set of possible conclusions. A wide variety of matters may be addressed using the various embodiments of the present invention, including, but not limited to, financial statement audits, various attestations engagements and business process quality determinations.

For example, in general implementations, an embodiment of the present invention may apply AI/ML and/or a Scoring Engine specific to each type of engagement to obtain the evidence necessary to conclude as well as to support those conclusions. The AI/ML and/or Scoring Engine may dynamically inform user judgments to drive the user from Activity to Activity based upon the scoring of the results achieved after each Activity is completed so that conclusions may be reached with sufficient appropriate evidence to support those conclusions.

With an embodiment of the present invention, procedures to be performed are not pre-determined in a "link-chain" approach as with current systems. Instead, as each procedure is completed, the results may be evaluated to determine dynamically the next procedure to perform resulting in building a "chain" of procedures unique to each use.

FIG. 1 is an exemplary diagram, according to an embodiment of the present invention. FIG. 1 illustrates a Documentation Database 110 and an Activity Database 120. An embodiment of the present invention is directed to linking Activities from the Activity Database 120 and data from the Documentation Database 110.

As shown in FIG. 1, an Activity 122 may include an Action 126, one or more Inputs 124 and one or more Outputs 128. For example, an Action 126 may represent a procedure (e.g., manual or automated) performed on the Inputs 124. Actions may be organized by purpose, type as well as nature and/or type of Outputs. Types of Actions may include: Inspection, Observation, Confirmation, Recalculation, Reperformance, Analytical Procedures, Inquiry, Concluding, Evaluating and Measuring. Inputs 124 may include data already obtained. Outputs 128 may include the results obtained from the Action 126.

The Activity Database 120 may manage and store a set of possible Activities, shown by Activity 122. Activity 122 may represent a single Activity, multiple Activities as well as a set of related or otherwise associated Activities. Database structure details may vary depending on the nature of the engagement. Generally, each Input is related to the Activity that generates the Input as its Output, each Output is related to each Activity that uses the Output and each Action is related to the Phase and Object of the Phase to which it is relevant. In an audit, for example, an Action to conduct a preliminary analytical review may be related to a Risk Identification Object, with the General Ledger ("G/L") Input related to the Activity that ingests the G/L into the audit Tool and the Output related to various potential Activities depending on the results of the preliminary analytical review.

The Documentation Database 110 may manage and store data already known by the system. For example, Documentation Database 110 may manage and store Client Data 112, External Data 114 and Previous Output Data 116. An example of each, which correlates to the example provided in FIG. 7A-7D below include an AR Aging report as of 11/30/xx as client data on FIG. 7A, Confirmation.com vendor fee cost as External Data 114 on FIG. 7C, and prepared confirmation letters as Previous Output Data 116 on FIG. 7C. The Documentation Database 110 may provide the Inputs to Actions and may be updated by the Outputs from those Actions. An example, which correlates to the example provided on FIG. 7A below include Input 722 of Accurate AR Aging report as of 11/30/xx, Action 724 of Trace the AR Aging report to the trial balance. Does the AR Aging report have reconciling items?, and Output 726 of whether reconciling items are present (Yes or No). The Output of whether or not reconciling items exist will update the Documentation Database 110.

An embodiment of the present invention may support various types of activities including Higher Order Activities. There may be situations where there is a need to review or analyze Activities performed or supervise those who are in the process of performing Activities (e.g., Higher Order Users). Accordingly, such reviews, analyses and supervision may be enabled by including Activities in the Documentation Database with a Higher Order Activity Database serving as the Activity Database. Other types of Activity Databases may be implemented to address various applications, use cases, scenarios, etc.

An embodiment of the present invention is directed to developing Actions. An "Action" may represent a decision, conclusion and/or procedure an auditor or user undertakes in response to the Inputs. Developing Actions may involve: determining inputs necessary to complete the Action. Actions are developed when their Output may be used in a subsequent Activity.

As shown in FIG. 1, Activity Inputs 124 may come from any or all Documentation Database components and, if output data, were themselves the output of earlier activities. An example, which correlates to the example provided on FIG. 7A below includes Output 714 which is the date for sending confirmations. This Output is used as Input 716.

Activity Outputs, as shown by 128, may update the output data in the Documentation Database for use in future activities. For example, Previous Output Data 116 may refer to Outputs prior to the current Activity where the connection from Output 128 to Previous Output Data 116 illustrates that the Output Data section of the Documentation Database is updated to be the "Previous Output Data" that is available for use in subsequent Activities.

Activity Inputs and Outputs in the Activity Database 120 may represent the specific information needed, rather than all the actual information included in the Documentation Database 110.

Both the Documentation Database 110 and the Activity Database 120 may be structured and digitized. As shown in FIG. 1, the Activity Database 120 may store various Actions and data. Inputs 124 may represent information necessary to perform the Action and Outputs 128 may represent the results of the Action and serve as Inputs to later Activities. As a result, the Activity Database structure may drive the Documentation Database 110.

While Databases 110 and 120 are shown as single components for illustration purposes, Databases 110 and 120 may represent various different database structures and architectures.

Figure 2:
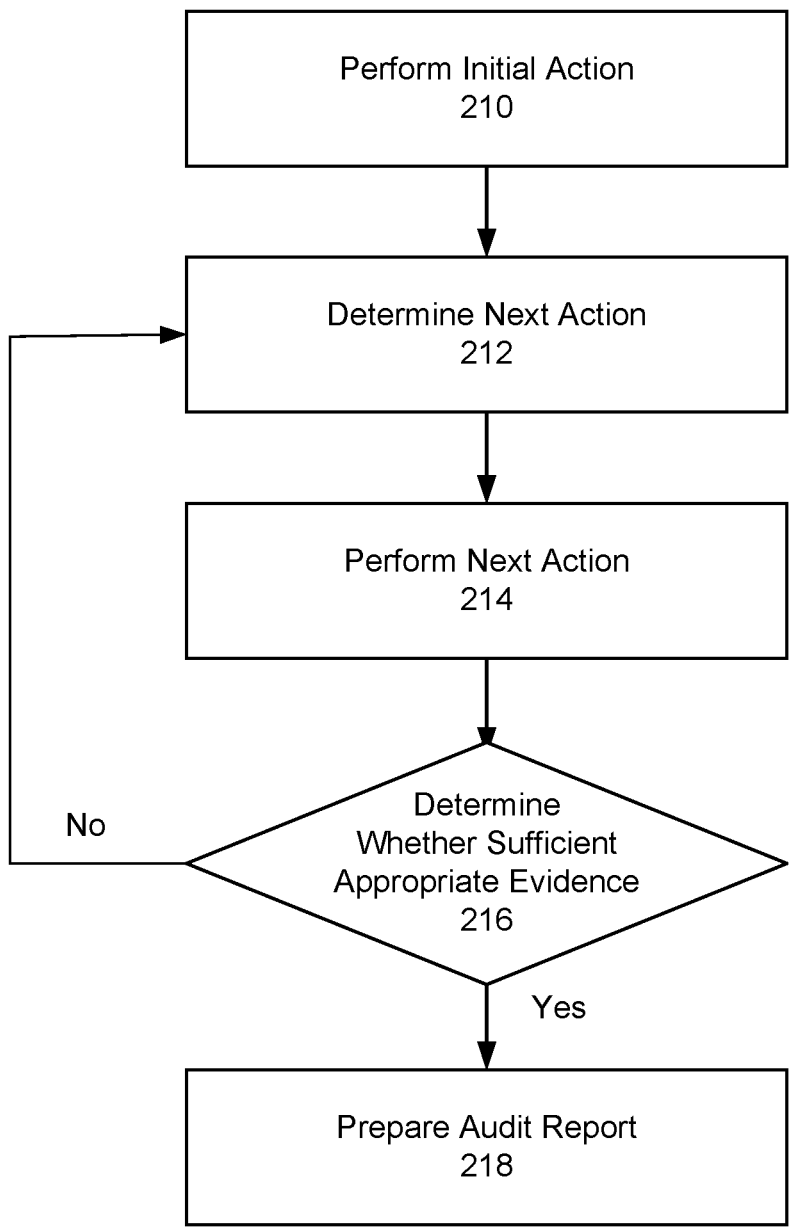
FIG. 2 is an exemplary flowchart, according to an embodiment of the present invention.

FIG. 2 is an exemplary flowchart, according to an embodiment of the present invention. At step 210, an embodiment of the present invention may perform an Initial Action. Step 212 may determine which Action should be performed next. Step 214 may perform a Next Action. Step 216 may determine whether sufficient appropriate evidence has been obtained to arrive at a solution. If evidence is determined to be sufficient, the process proceeds to prepare a report at step 218. Otherwise, the process goes back to Step 212 and then iterates until sufficient appropriate evidence has been obtained. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 210, an embodiment of the present invention may perform an Initial Action, which may generally include importing data expected to be relevant to the solution process.

Step 212 may determine which Action should be performed next. This may be based upon an evaluation of the Output from the Initial (Previous) Action. This may also involve dynamically identifying a set of Activity options as Potential Activities. Based on scoring and/or other determinations, an optimal activity may be identified from the Potential Activities. Activities may be designed to provide evidence.

Step 214 may then perform the Next Action. The Next Action may correspond to the determined optimal activity. This process may continue until an optimal series of activities has been determined.

Step 216 may determine whether sufficient appropriate evidence has been obtained to arrive at a solution that not only is sufficient and appropriate as defined by the nature of the problem. Not all possible Actions may need to be performed. An embodiment of the present invention is directed to a dynamic determination of the next Action to be performed from among the set of possible Actions. The dynamic nature of Activity selection as the engagement proceeds is an important factor in determining engagement efficiency.

If evidence is determined to be sufficient, the process proceeds to prepare a report at step 218. For example, Step 218 may prepare an Audit Report. Other outputs and results may be generated. The flowchart illustrated in FIG. 2 results in a set of procedures unique to the circumstances for each engagement, with the procedure set built one procedure at a time as the previous procedure is evaluated to determine the next procedure to perform.

Otherwise, the process goes back to Step 212 and then iterates until sufficient appropriate evidence has been obtained.

The process illustrated in FIG. 2 applies to Activities and other types of Activities including Higher Order Activities.

Figure 3:
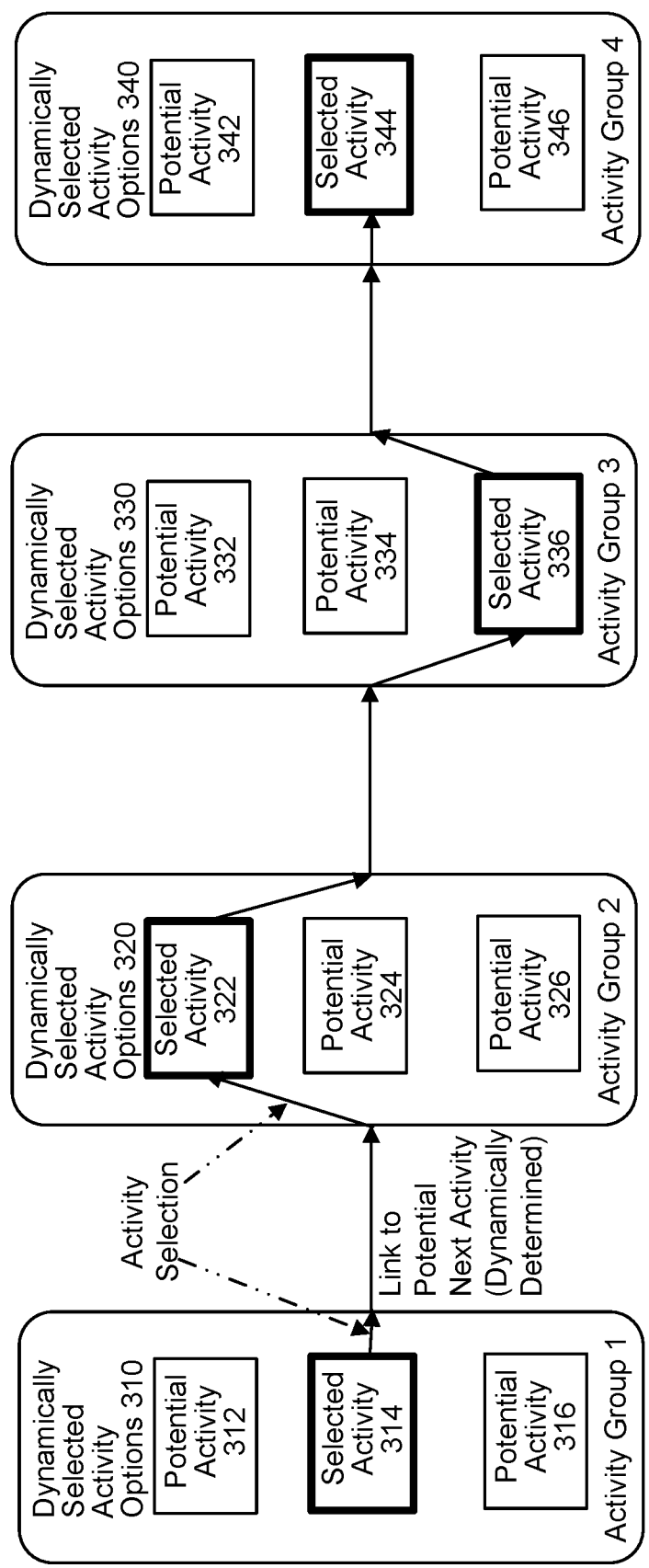
FIG. 3 is an exemplary illustration of an activities-based methodology, according to an embodiment of the present invention.

FIG. 3 is an exemplary illustration of an activities-based methodology, according to an embodiment of the present invention. As shown in FIG. 3, a Potential Activity may represent an Activity that is relevant to an engagement with required Inputs already obtained. If required Inputs have not been obtained, the Activity whose Output is the required Input may be considered a Potential Activity. An example, which correlates to the example provided on FIG. 7A below includes Input 716 of AR Aging report as of 11/30/xx. If the AR Aging report as of 11/30/xx is not already obtained, a Potential Activity may include "Date to send confirmations 11/30/xx" as an Input, "Obtain AR Aging report from client contact Jane Doe" as an Action and an Output of "AR Aging report as of 11/30/xx". In this example, the AR Aging report as of 11/30/xx is will be obtained after completing this Activity.

According to an embodiment of the present invention, Activities may be structured and digitized. This may involve structuring Activities by type of evidence they are designed to elicit, which may be shown as "Activity Groups" illustrated as Activity Group 1, Activity Group 2, Activity Group 3, Activity Group 4, etc. Other categories for structuring Activities may be applied. FIG. 3 shows three potential Activities for each Activity Group. However, there may be any number of Activities in a Group and different Groups may have different numbers of Activities. Furthermore, the Output of each Activity is not limited and dynamically drives the next optimal Activity.

By digitizing and structuring audit Activities and relating the Activity Database and the Documentation Database, an embodiment of the present invention may not only select Activities to perform to obtain sufficient, appropriate evidence but also identify the order in which to select them. Accordingly, no additional overarching structure is needed.

Figure 4:
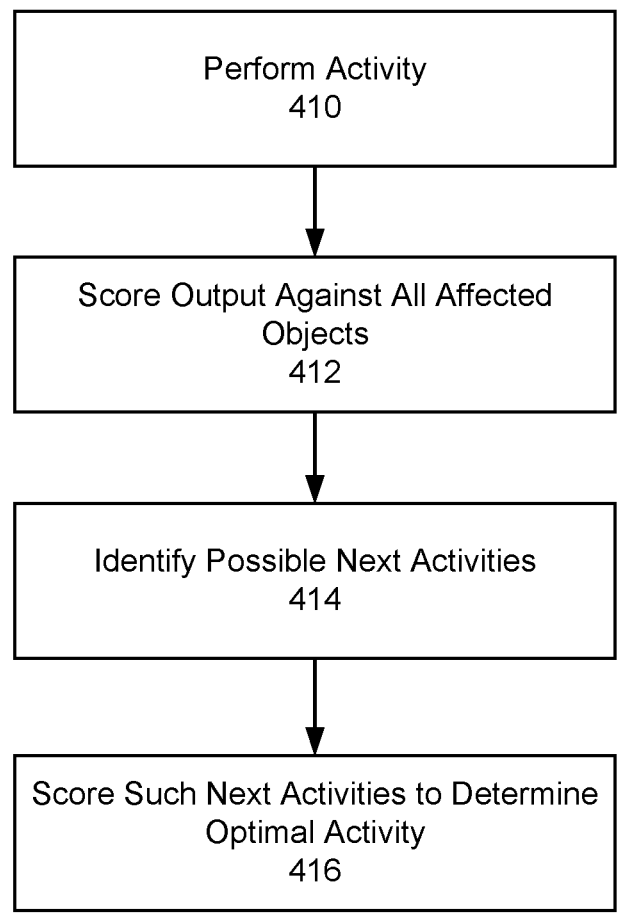
FIG. 4 is an exemplary flowchart, according to an embodiment of the present invention.

FIG. 4 is an exemplary flowchart, according to an embodiment of the present invention. At step 410, an Activity may be performed. At step 412, an Output may be scored against Affected Objects. At step 414, possible next Activities may be identified. At step 416, Activities may be scored to determine an Optimal Activity. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 410, an Activity may be performed. Each Activity may include Input(s), an Action and corresponding Output (s). Actions may include: Inspection, Observation, Confirmation, Recalculation, Reperformance, Analytical Procedures, Inquiry, Concluding, Evaluating, Measuring, etc. Actions may vary depending on type of Audit, entity industry, objectives, etc. In addition, Actions may apply to various other industries, applications, use cases, etc.

Step 412 may score an output against all affected objects. For example, an Activity may be performed if its Output is necessary to provide sufficient evidence for an Object(s). Those Objects are the "affected objects." Objects may represent matters to resolve to determine an optimal solution. For example, in an audit, objects may include identified risks, assessed risks, etc. For example, identifying specific objects relevant to the engagement or updating evidence for an object(s) may represent a goal of the Activity and its Output. To determine an optimal solution, sufficient evidence should be obtained regarding each object relevant to the solution. An embodiment of the present invention is directed to determining a score for each object, e.g., an object score.

Prior to the implementation of AI and scoring algorithms, scoring may be determined heuristically. For example, the score may be determined by the nature of the Object and the Phase of the engagement the object is in. In an audit's Risk Assessment Phase, an Object may be an assessed risk and its score may be related to the significance of the risk (e.g., the higher the score, the more significant the risk).

Evidence relevant to that object may be obtained with an evidence score meeting or exceeding the object score. Evidence persuasiveness may be determined by the nature, timing and extent of a procedure (an Action), as well as the reliability of the data used in that procedure (Input) and the results of the Action (Output). That evidence may be compared to the score of the Object to determine if sufficient evidence about the Object has been obtained. For example, if accounts receivable confirmations are sent to address an existence risk and the existence risk has a risk score of 40 and if the confirmation set of Activities (e.g., consider partial example of individual Activities necessary to send confirmations and then consider additional Activities necessary to evaluate confirmation results, among other Activities) ultimately achieves a score equal to or greater than 40, no additional Activities related to the AR existence risk Object may be necessary.

When an Activity is completed, Outputs may update both Object scores required and evidence obtained towards those Objects to determine the remaining evidence needed.

For example, scoring, either AI or heuristically, may be based upon an importance of the Activity, given the results to date. Activities may be considered important because they can provide necessary evidence for Objects and their attributes for that phase that currently is lacking. It is where there is insufficient evidence given the importance of an Object and its attributes that can be addressed, in whole or in part, by the Activity that makes the Activity important. Thus, in an audit, an Activity may be important in one stage of an audit but in a different audit at the same stage, the same Activity may be less important because the evidence needed may differ from the first audit. An Activity may provide evidence for multiple Objects, but the level of evidence it provides may differ for each Object. Accordingly, deciding if the Activity should be performed depends on remaining evidence needed for each Object and the ability of the Activity to provide that evidence, given the evidence related to those Objects that has already been obtained.

Step 414 may identify possible next Activities. Step 414 may involve listing the Activities for which necessary or key Inputs have been obtained that provide sufficient evidence for Objects still requiring evidence or that are necessary to identify or score new Objects. For example, in an audit, an Object may represent an audit risk, but a new Object may be necessary to represent the assessed risk. In this example, the auditor identifies risks, assesses the significance of those risks and then plans and performs procedures designed to sufficiently address those assessed risks. Here, the risk is a different Object identified in a different audit Phase from the assessed risk.

Each scoring action may have its own set of parameters that depend upon the nature of the problem and related solution set. Such parameters may include temporal factors, personnel availability, level of evidence expected to be obtained from an Activity and expected importance of the Activity for discussion with others (such as the client), among other factors.

Step 416 may score such activities to determine an optimal activity. For each possible next Activity, an embodiment of the present invention may rank an expected score of Output against a score needed for each affected Object. For most engagements, it would be sufficient to score all possible next Activities based on those Activities that, based on engagement results to date, ultimately will be necessary (knowing that as additional Activities are performed, such necessary Activities may dynamically change), score them and choose the one with the highest score. For certain types of engagements it may be necessary to use a min/max or other scoring system.

For each affected Object, an embodiment of the present invention may rank relevant Activities by effectiveness and/or efficiency score. For most engagements, it would be sufficient to have an evidence score and an efficiency score. This may involve ranking Activities that individually or when conducted with other Activities provide sufficient evidence, gathering possible combinations that provide sufficient evidence for an Object and then choosing the one with the highest efficiency score (e.g., selecting the most efficient approach that provides sufficient evidence).

There may be variations depending on the specific problem to be solved. For example, in an audit, audit risks (e.g., Objects) may be grouped by type (e.g., revenue related risks) and scoring may determine the most effective and/or efficient Activities needed to address each group of Objects. For example, only those Activities needed in the most effective/efficient chain may be carried forward to the next step. This decision may be revised as Activities are performed. For Activities determined to be relevant, an embodiment of the present invention may score them to determine the Optimal Activity to perform next.

Figure 5:
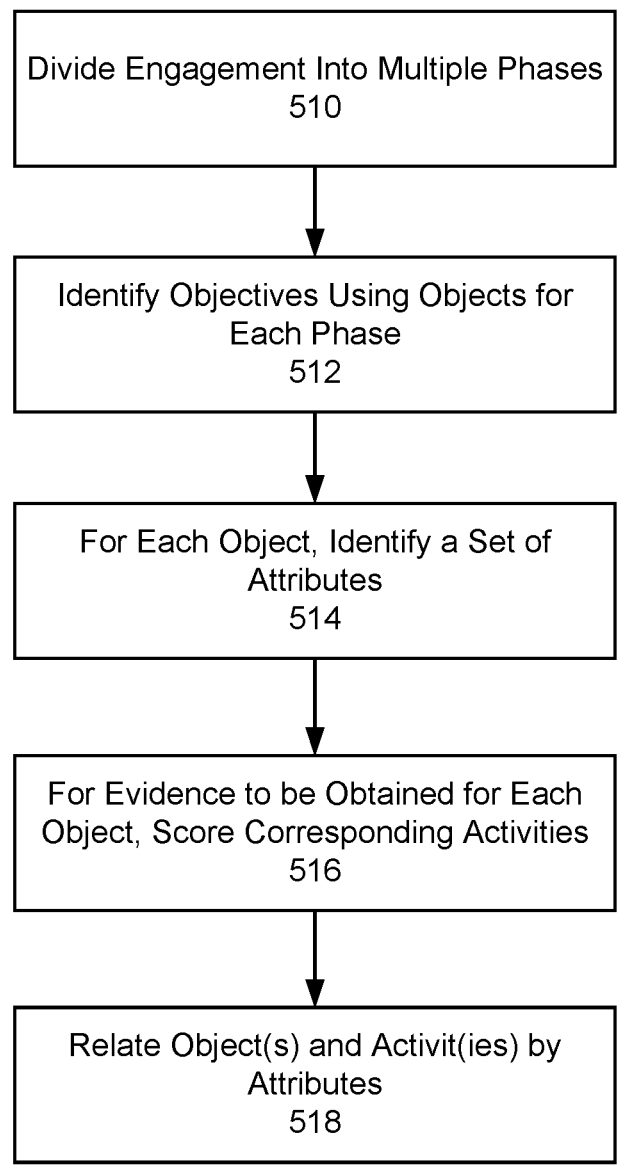
FIG. 5 is an exemplary flowchart, according to an embodiment of the present invention.

FIG. 5 is an exemplary flowchart, according to an embodiment of the present invention. At step 510, an engagement may be divided into multiple phases. At step 512, objectives may be identified using objects for each phase. At step 514, for each object, a set of attributes may be identified. At step 516, for evidence to be obtained for each object, corresponding activities may be scored. At step 518, objects and activities may be related by attributes. While the process of FIG. 5 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 510, an engagement may be divided into multiple phases. A "Phase" may represent a portion of an engagement with a distinct set of objectives.

At step 512, objectives may be identified using an object or objects for each phase. Objectives may be measured using "Objects." Objects of one Phase may be used in the articulation of Objects in the next Phase. For example, in an audit, Activities may be performed with the Objective of risk identification. Risk identification is the Object. The risk identification Object may also be used to assess (score) risks. During this next set of Activities, risk assessment may represent the Object. This provides continuity for the engagement permitting the engagement to proceed in an orderly fashion and allowing for the orderly evaluation of Output from an Activity in one Phase to modify previous Phases, as necessary. For example, in an audit, an Output from a Risk Response Activity may indicate that an identified Risk (e.g., an Object in an earlier Risk Assessment Phase) may need to have its risk score increased or otherwise modified.

At step 514, for each object, a set of attributes may be identified. Each Object may have specific attributes, such as evidence needed to satisfy the attribute and evidence accumulated thus far.

At step 516, for evidence to be obtained for each object, corresponding activities may be scored. Activities may be scored for the evidence to be obtained for each object, given the nature of the Action, the timing and the extent of Activity performance. These scores may be based on a method specific to each Object's objective, with one Activity having the potential for different scores for each Object impacted since the persuasiveness of evidence provided by an Activity may differ for different Objects. For example, in an audit confirmation of accounts receivable may provide more persuasive evidence for risks related to existence than for risks related to valuation.

At step 518, Objects and Activities may be related by attributes. Objects and Activities may be related by one or more specific Attributes assigned to each that permit an embodiment of the present invention to identify the Activities that provide evidence for each Object.

According to an embodiment of the present invention, each Phase's Activities may address Objects relevant to that Phase. If working on multiple Phases at the same time (e.g., in an audit responding to some risks while still identifying and assessing other risks), Activity scoring may facilitate prioritizing Activities in different Phases as well as those that address different Objects in a Phase.

Attributes needed for scoring which Activity to perform next may include: Personnel availability; Time to complete (e.g., hours needed); Completion date required for the engagement as a whole and for resolution of Objects whose completion is known to be necessary; and Availability of Inputs. Other attributes or variations thereof may be implemented and realized by the various embodiments of the present invention.

In addition, an embodiment of the present invention may distinguish between those scores identified and/or resolved with a high degree of confidence as opposed to those scores whose identification and/or resolution may not be so confidently resolved. For example, this may involve determining what is the variance around the score, assuming the score is determined by an unbiased expected value estimator. This may also be known as the 51% problem versus the 99% problem and relate to which scores need to be determined with a high degree of confidence.

Figure 6:
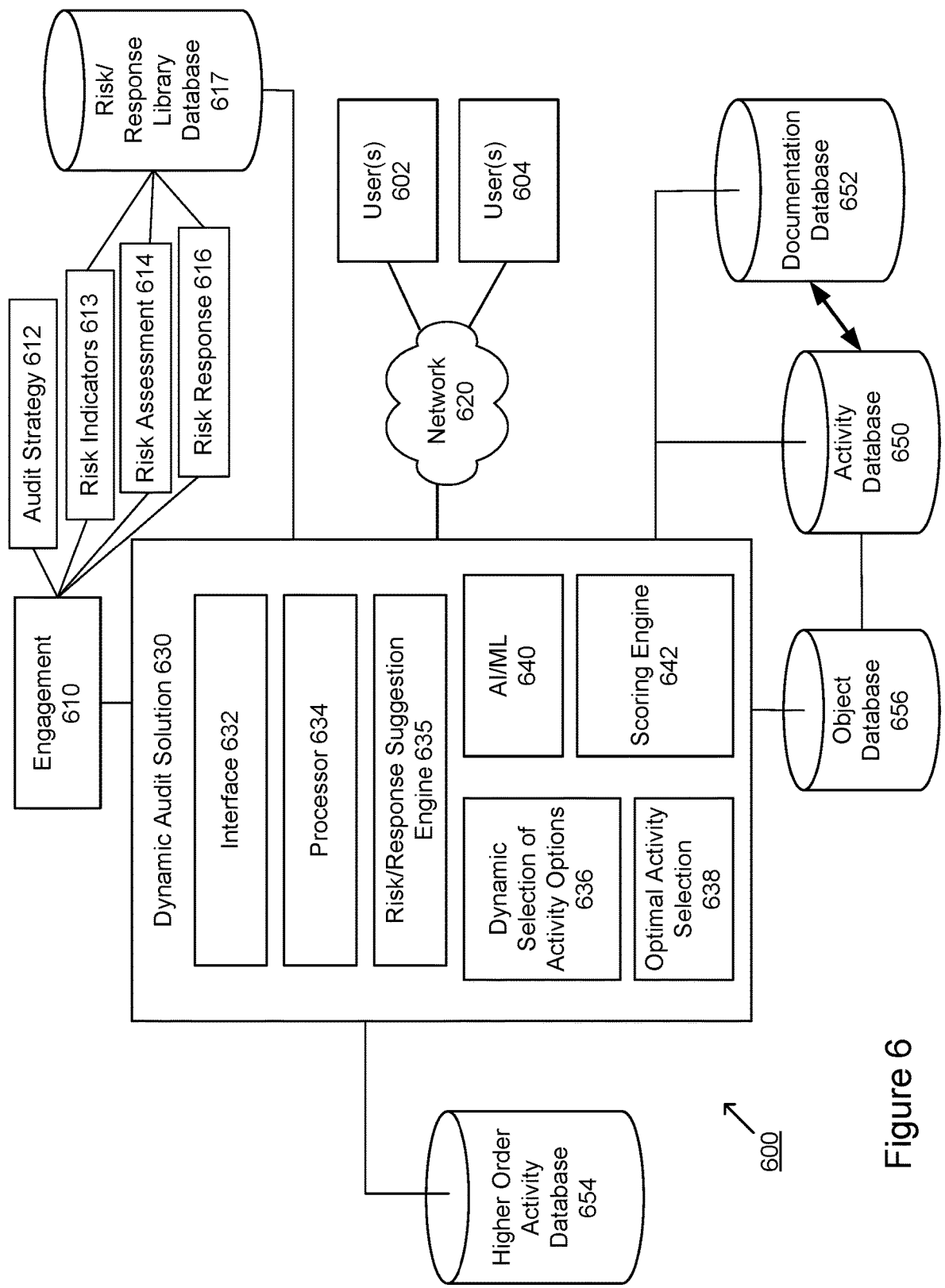
FIG. 6 is an exemplary system diagram, according to an embodiment of the present invention.

FIG. 6 is an exemplary system diagram, according to an embodiment of the present invention.

An embodiment of the present invention provides various benefits and advantages that are unavailable with current systems. With current systems, procedures are performed in a fixed order with the possibility of alternative fixed order processes if certain pre-determined possibilities occur. Procedures stay stagnant from audit plan through audit execution. In contrast, with an embodiment of the present invention, procedures may be determined after the results of the previous procedure are obtained and evaluated. This provides for dynamic procedure building that may accept any possibility for which the set of possible Activities contains an appropriate response.

Current systems cannot address unexpected results. These must be developed outside the tool with necessary manual changes to the process's fixed order also determined outside the tool. However, an embodiment of the present invention may accept any possibility and dynamically build procedures provided that the set of possible Activities contains a procedure that can address the unexpected results.

Because the order is fixed in current systems, the focus is for the process user to provide documentation for completed procedures. With an embodiment of the present invention, the procedures are dynamically determined. Accordingly, an embodiment of the present invention is focused on determining the next step to complete and then on providing documentation for completed procedures.

FIG. 6 illustrates Dynamic Audit Solution 630 that executes Processor 634 to provide a data-driven approach based on a dynamic real-time determination of auditor action and evaluation of audit results. Dynamic Audit Solution 630 provides a real-time dynamic audit approach for various users, represented by Users 602, 604 via Network 620. Users 602, 604 may represent a preparer, a higher order user, as well as other users specific to various applications, industries, use cases, etc. Dynamic Audit Solution 630 may interact with Engagement 610 as an integrated system/component or as a third party service provider. Other implementations and relationships may be realized. Engagement 610 may provide a variety of functions and services, including but not limited to Audit Strategy 612, Risk Indicators 613, Risk Assessment 614 and Risk Response 616. Risk Indicators 613 may interact with Risk/Response Library Database 617 to leverage information gathered in the execution of the audit to suggest which risks may be relevant and then brought into the system as part of the Risk Assessment 614. Risk Response 616 may interact with the Risk/Response Library Database 617 to suggest relevant response procedures based on the risks that have been identified and assessed.

Interface 632 may enable users and/or other entities to interact with Processor 634. Interface 632 may include browser or other user interactive interface. User interaction may be supported through various user devices, including computers, laptops, mobile devices, smartphones, tablets, etc.

As shown in FIG. 6, Processor 634 may support various functions and features through Dynamic Selection of Activity Options 636, Optimal Activity Selection 638, AI/ML 640 and Scoring Engine 642. Other functions and features may be supported in various forms and implementations. While a single component is shown for illustration purposes, each component may represent a single or multiple instances across various locations, configurations and architectures.

Dynamic Selection of Activity Options 636 may identify a set of potential Activities that are relevant to the engagement with required inputs already obtained. Potential Activities may be grouped as Activity Groups by type of evidence they are designed to elicit, for example.

Optimal Activity Selection 638 may select an Activity to perform based on an ability or likelihood to obtain sufficient, appropriate evidence as well as an order in which to select Activities.

As shown by AI/ML 640, an embodiment of the present invention may implement and/or integrate Artificial Intelligence and Scoring to dynamically select Activities as well as dynamically select a next group of Activities from which to select the next option based on a dynamic evaluation of evidence sufficiency.

Scoring Engine 642 may calculate scores based on a dynamic evaluation of evidence sufficiency, efficiency, etc. While a single scoring engine is shown for illustration purposes, scoring may occur throughout the process and at various stages/phases.

Risk/Response Suggestion Engine 635 may suggest relevant risks from the Risk/Response Library Database 617 based on output of one or more activities performed in Planning or Understanding the Entity and its Environment, where Risk Indicators 613 may be generated by the Dynamic Audit Solution 630. Risk/Response Suggestion Engine 635 may also leverages Risk Indicators 613, Risks in the Risk Assessment 614 and/or other information to present potentially suitable Risk Response 616 procedures to be performed in response to identified and assessed risks. While a single suggestion engine is shown for illustration purposes, suggestions may occur throughout the process and at various stages/phases.

Activity Database 650 may store and manage Activities that include Inputs, Actions and Outputs. Various forms of data may be stored and managed. For example, Activity Database 650 may include potential auditor Actions, Inputs necessary to perform those Actions and potential Outputs (e.g., outcomes) from those Actions.

Documentation Database 652 may store and manage Inputs to Actions. Documentation Database 652 may also update by Outputs from the Actions. The updated Documentation Database may be evaluated (with AI and scoring from Scoring Engine) to determine the next Action to perform. The Documentation Database 652 may be queried to determine whether the Inputs for the Activity that includes the Action are available. If not, Actions necessary to obtain those Inputs may be evaluated to determine whether the initially determined Action is considered an optimal Action and, if so, the Actions necessary to obtain the Inputs are performed, followed by the initially determined Action.

After each Action is performed, the Documentation Database 652 may be evaluated to determine whether sufficient, appropriate audit evidence has been obtained. If so, an appropriate output, such as an audit report, may be prepared and issued. In this example, there may be a finite number of potential types of audit reports.

The flexibility permitted by the structure of the Documentation Database and the Activity Database, as well as their interconnectivity, provides for different views of the audit and thereby facilitates a more effective and efficient audit. For example, audit standards require the identification, assessment and conclusion by audit risk. An embodiment of the present invention readily permits the auditor to evaluate audit status by risk, by audit phase (e.g., audit planning, risk identification, risk assessment, audit response, risk conclusion and concluding procedures) based on the Activity Database structure.

Higher Order Activity Database 654 may store and manage Activities performed by higher order users. Higher Order Users may include supervisors and reviewers who need to analyze the Activities performed. For example, depending on need, there may be multiple Higher Order Activity Databases, some that operate independently of each other (for example, in an audit, supervision and review are higher order functions that may be undertaken separately), while others may be even higher order (for example, in an audit, an audit firm's quality control personnel may have an Activity Database the relates to a Documentation Database that includes both preparer and reviewer Activities).

Object Database 656 may store and manage attributes for each Object. For example, Object Database 656 may maintain a history as Attributes and Object scores change with the previous results and the reasons for the change in the history. In addition, Object Database 656 may be linked to Activity Database 650.

According to an embodiment of the present invention, Activity Database 650 may store and manage various Activities which may be structured and digitized and further include Inputs, an Action and Outputs. The Documentation Database 652 may be dynamic and updated on a real-time basis with the Outputs of Activities as they are performed. The Documentation Database 652 may be linked to the Activity Database 650. In addition, Actions and results may be dynamically sorted and re-sorted to enable desired information views to facilitate various decision-making processes. Results of previous Activities may dynamically determine the next Activity to perform. Further, Activities may be incorporated in the Documentation Database 652 to facilitate the use of Higher Order Activities. The next Activity to perform may be determined by using the Documentation Database results and the Activity Database structure. This determination may be performed judgmentally, automatically via Artificial Intelligence (as shown by 640) and Scoring (as shown by 642), or by a combination of these methods.

Combinations of these unique features permit the construction of a flexible tool where evidence gathered to date dynamically determines the next procedure to perform. This is in contrast to current systems that use "link chain" (or "if this, then that") approaches that are limited to predetermined options.

Risk/Response Library Database 617 may store and manage lists of and attributes relating to: Risks, Risk Groupings, Financial Statement Areas, Risk Response procedures, Control Objectives and/or other related pieces of information. The various items stored within the Risk/Response Library Database may be related to one another and also have information about which items from this database have been added to or used in a particular audit engagement.

The system architecture 600 of FIG. 6 may be implemented in a variety of ways. Architecture within system 600 may be implemented as hardware components (e.g., module) within one or more network elements. It should also be appreciated that architecture within system 600 may be implemented in computer executable software (e.g., on a tangible, non-transitory computer-readable medium) located within one or more network elements. Module functionality of architecture within system 600 may be located on a single device or distributed across a plurality of devices including one or more centralized servers and one or more mobile units or end user devices. The architecture depicted in system 600 is meant to be exemplary and non-limiting. For example, while connections and relationships between the elements of system 600 are depicted, it should be appreciated that other connections and relationships are possible. The system 600 described below may be used to implement the various methods herein, by way of example. Various elements of the system 600 may be referenced in explaining the exemplary methods described herein.

Network 620 may be a wireless network, a wired network or any combination of wireless network and wired network. For example, Network 620 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 620 may support an Internet network, a wireless communication network, a cellular network, Bluetooth, or the like, or any combination thereof. Network 620 may further include one, or any number of the exemplary types of networks mentioned above operating as a stand-alone network or in cooperation with each other. Network 620 may use one or more protocols of one or more network elements to which it is communicatively coupled. Network 620 may translate to or from other protocols to one or more protocols of network devices. Although Network 620 is depicted as one network for simplicity, it should be appreciated that according to one or more embodiments, Network 620 may comprise a plurality of interconnected networks, such as, for example, a service provider network, the Internet, a cellular network, corporate networks, or even home networks, or any of the types of networks mentioned above.

Data may be transmitted and received via Network 620 using a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may use cabled network or telecom connections such as an Ethernet RJ45/Category 5 Ethernet connection, a fiber connection, a cable connection or other wired network connection.

While FIG. 6 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals. Interface 632 may represent a user interface and/or other interactive communication portal.

Dynamic Audit Solution 630 may be communicatively coupled to Databases 617, 650, 652, 654, 656. Databases 617, 650, 652, 654, 656 may include any suitable data structure to maintain the information and allow access and retrieval of the information. For example, Databases 617, 650, 652, 654, 656 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 617, 650, 652, 654, 656 may be any suitable storage device or devices. The storage may be local, remote, or a combination thereof with respect to Databases 650, 652, 654, 656. Databases 617, 650, 652, 654, 656 may use a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 617, 650, 652, 654, 656 may have back-up capability built-in. Communications with Databases 617, 650, 652, 654, 656 may be over a network, or communications may involve a direct connection between Databases 617, 650, 652, 654, 656 and Engagement 610, as depicted in FIG. 6. Databases 617, 650, 652, 654, 656 may also represent cloud or other network based storage.

FIGS. 7A-7D illustrate an example, according to an embodiment of the present invention. An example of an embodiment of the present invention relates to conducting financial statement audits. In this example, audit standards provide a finite solution set and a set of parameters for determining which solution is appropriate. In addition, a set of possible auditor Actions may be developed. Intermediate potential solutions for interim and final fieldwork may be developed to facilitate preparer-user Action determination as well as temporally-based Higher Order Activity Actions for other users, such as supervisors and reviewers.

For illustration purposes, there is a rebuttable presumption that an audit plan includes external confirmation of accounts receivable ("AR") balances. An AR Confirmation is a letter sent to customers requesting that they confirm the amount of accounts receivable outstanding as of a specific date directly with the auditor. In this example, A/R confirmations may be determined to be an appropriate response to the risk of material misstatement.

Figure 7A:
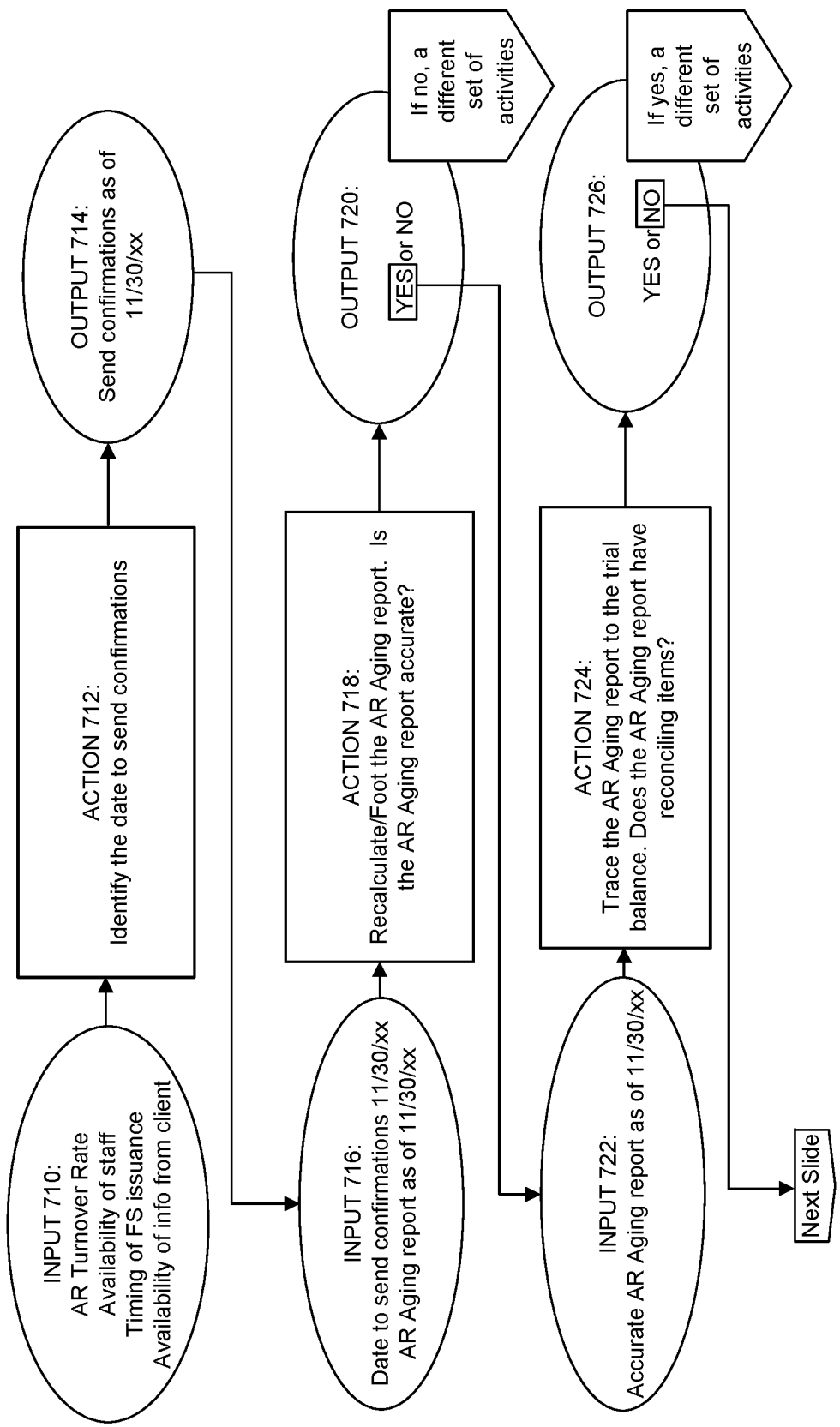
FIGS. 7A-7D illustrate an example, according to an embodiment of the present invention.

As shown in FIG. 7A, Input 710 may include: AR Turnover Rate, Availability of Staff, Timing of Financial Statement ("FS") issuance, and Availability of information from the client. Action 712 may include: identify the date to send confirmations. Output 714 may include: send confirmation as of a certain date.

Using information from Output 714, Input 716 may include: date to send confirmations of a certain date and AR aging report as of a certain date. Action 718 may include: recalculate/foot the AR aging report and determine whether the AR aging report is accurate. This Action may further involve: select a sampling of invoices to determine that they are in the proper aging category or test controls over the report aging categories. Output 720 may include: Yes or No. If no, a different set of activities may be performed. If yes, the process proceeds to Input 722.

Input 722 may include: accurate AR aging report as of a certain date. Action 724 may include: trace the AR aging report to the trial balance and determine whether the AR aging report has reconciling times. Output 726 may include Yes or No. If yes, a different set of activities may be performed. If no, the process proceeds to Input 730.

Figure 7B:
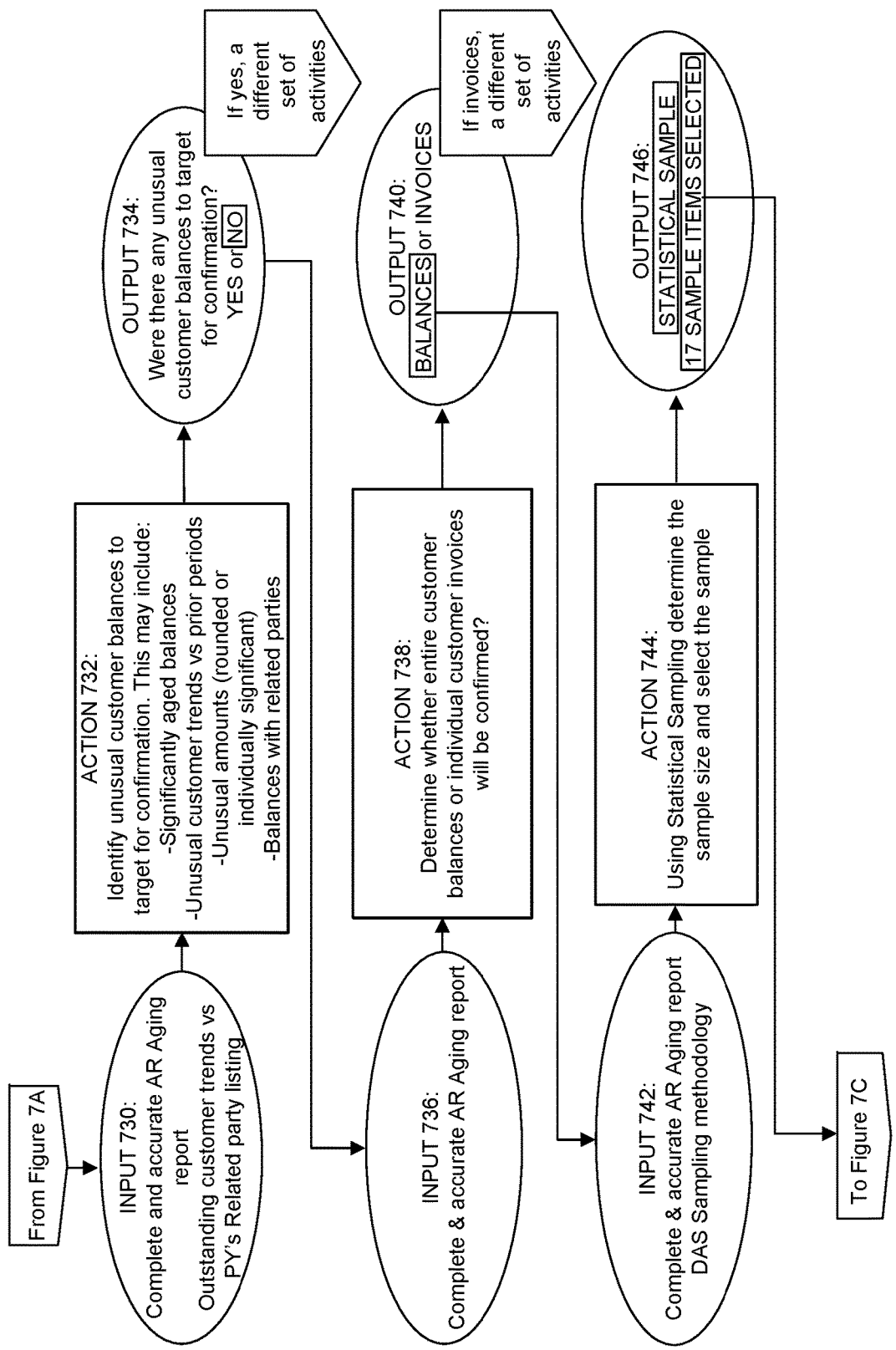

As shown in FIG. 7B, Input 730 may include: complete and accurate AR aging report and outstanding customer trends versus prior year's (PY's) related party listing. Action 732 may include: identify unusual customer balances to target for confirmation. This may further include: significantly aged balances; unusual customer trends versus prior periods; unusual amounts (rounded or individually significant) and balances with related parties. Output 734 may include: a determination of customer balances to target for confirmation. If no, a different set of activities may be performed. If yes, the process proceeds to Input 736.

Input 736 may include: complete and accurate AR aging report. Action 738 may include: determine whether entire customer balances or individual customer invoices will be confirmed. Output 740 may include balances or invoices. If invoices, a different set of activities may be performed. If balances, the process proceeds to Input 742.

Input 742 may include: complete and accurate AR aging report and sampling methodology. Action 744 may include: using statistical sampling determine the sample size and select the sample. Output 746 may include: statistical sample and a number of sample items selected.

Figure 7C:
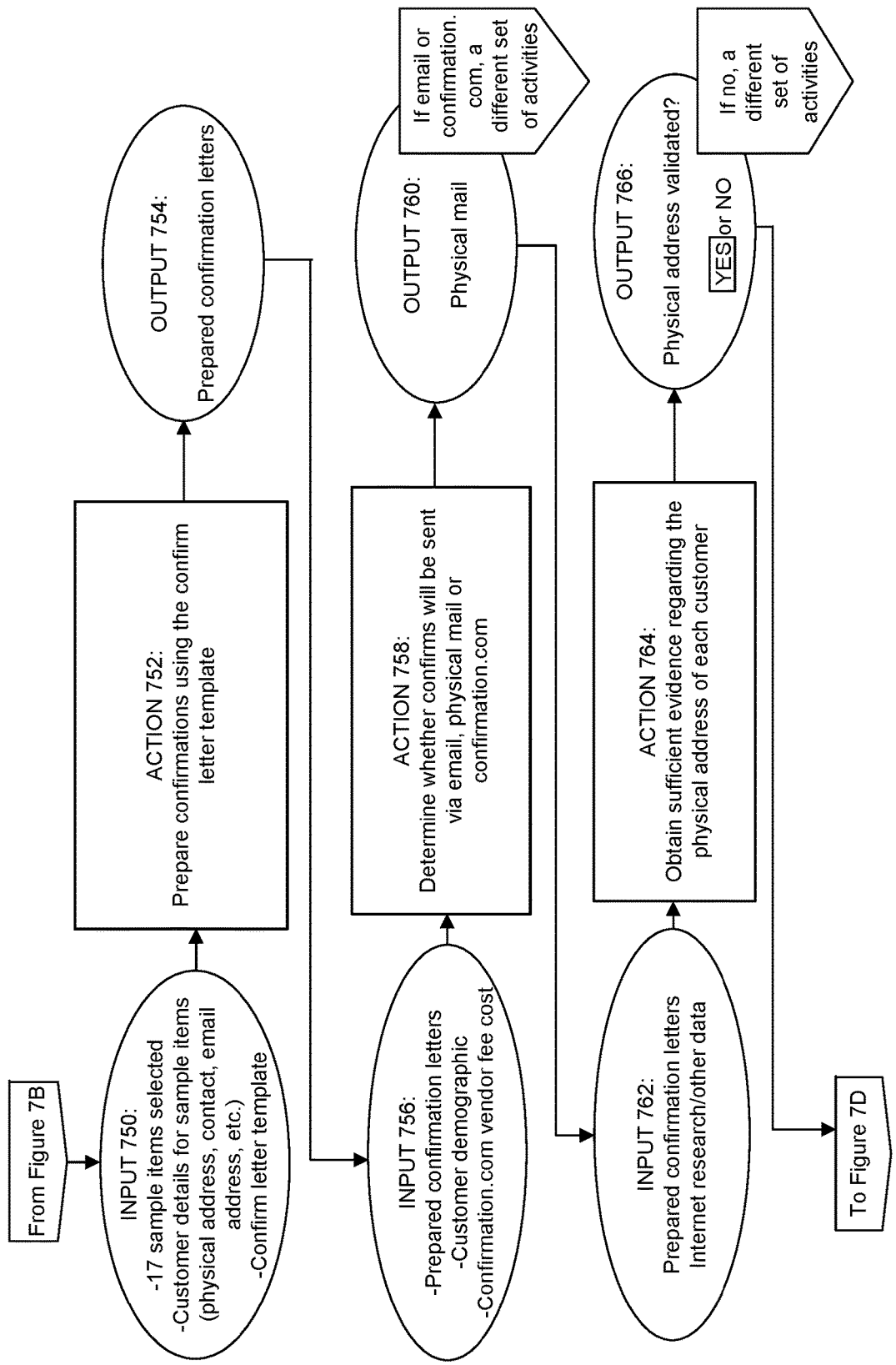

As shown in FIG. 7C, Input 750 may include: the number of sample items selected; customer details for sample items (e.g., physical address, contact, email address, etc.); and confirm letter template. Action 752 may include: prepare confirmations using the confirm letter template. Output 754 may include: prepared confirmation letters.

Input 756 may include: prepared confirmation letters, customer demographic, and confirmation company vendor fee cost. Action 758 may include: determine whether confirms will be sent via email, physical mail or vendor. Output 760 may include: physical mail. If email or vendor, a different set of activities may be performed. With physical mail, the process proceeds to Input 762.

Input 762 may include: prepare confirmation letters and research/other data. Action 764 may include: obtain sufficient evidence regarding the physical address of each customer. Output 766 may include: whether the physical address has been validated. If no, a different set of activities may be performed. If yes, the process proceeds to Input 770.

Figure 7D:
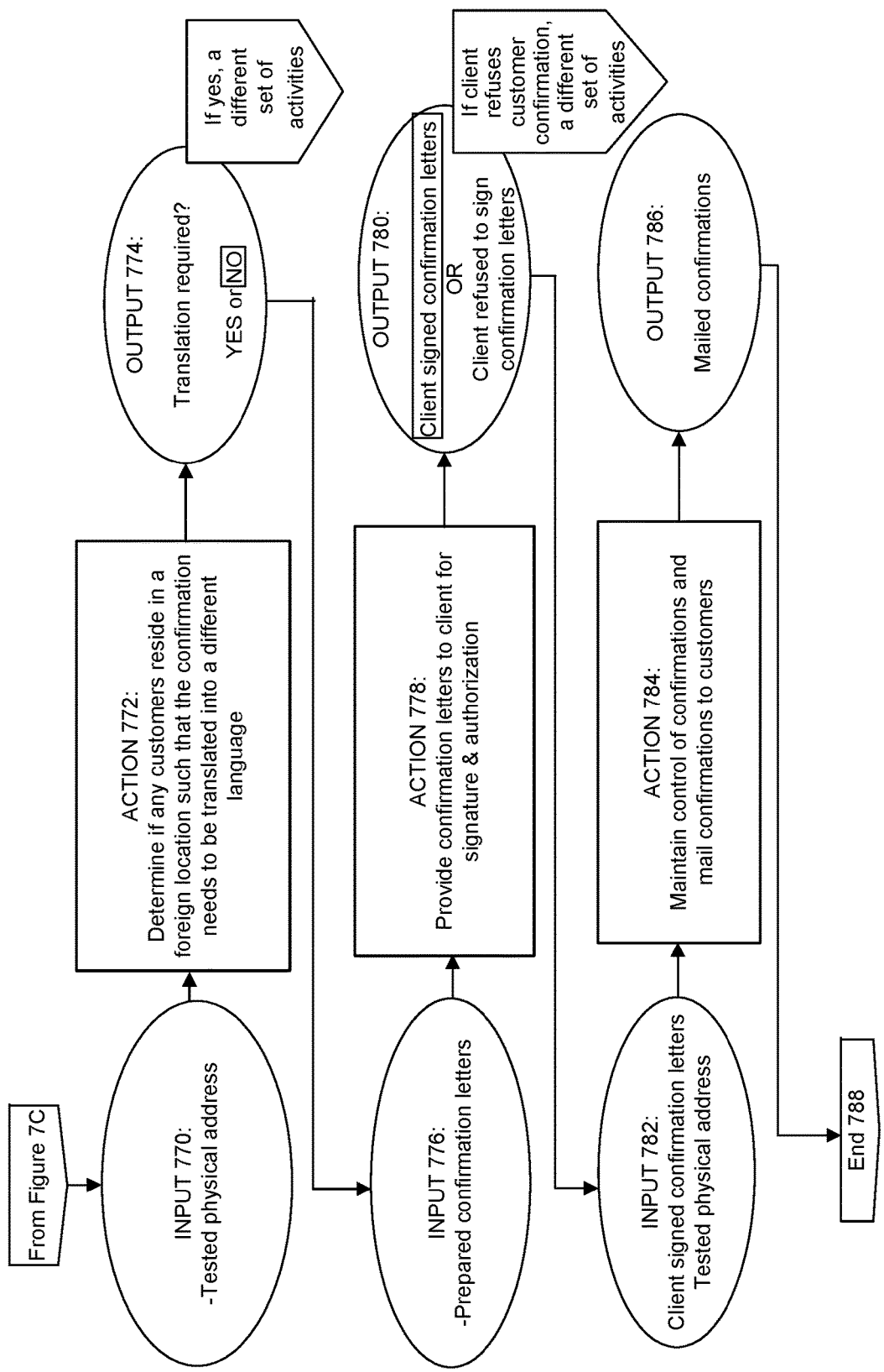

As shown in FIG. 7D, Input 770 may include: tested physical address. Action 772 may include: determine if any customers reside in a foreign location such that the confirmation needs to be translated into a different language. Output 774 may include: a determination of whether a translation is required. If yes, a different set of activities may be performed. If no, the process proceeds to Input 776.

Input 776 may include: prepare confirmation letters. Action 778 may include: provide confirmation letters to client for signature and authorization. Output 780 may include: client signed confirmation letters or client refused to sign confirmation letters. If the client refuses, a different set of activities may be performed. If the client signed, the process proceeds to Input 782.

Input 782 may include: client signed confirmation letters and tested physical addresses. Action 784 may include: maintain control of confirmations and mail confirmations to customers. Output 786 may include: mailed confirmations. The example ends at 788.

The illustration shown by FIGS. 7A-7D represents a portion of an audit confirmation effort and does not represent a complete part either of that effort or an audit as a whole.

As shown in FIGS. 7A-7D, an embodiment of the present invention promotes consistency and compliance with professional standards while dynamically providing for different set of Activities, as results are obtained. Moreover, the innovative approach develops auditors as they perform work with detailed and dynamic Activities.

Figure 8:
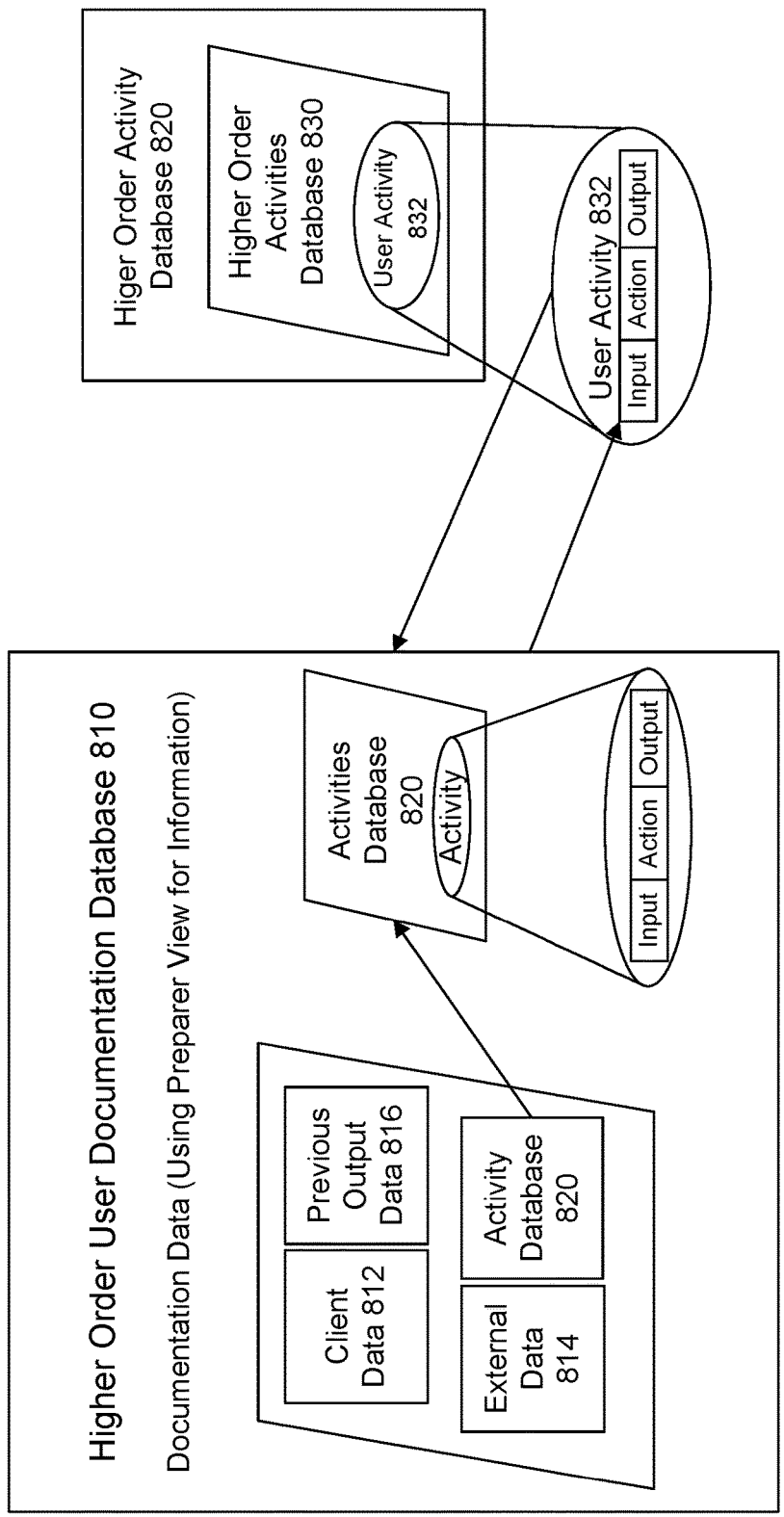
FIG. 8 is an exemplary diagram, according to an embodiment of the present invention.

FIG. 8 is an exemplary diagram, according to an embodiment of the present invention. According to an embodiment of the present invention, Higher Order users may be accommodated by adding the Higher Order Activities to the original Higher Order Documentation Database so that both preparer Activities and the first Higher Order user Activities are in the even Higher Order Documentation Database with a new even Higher Order Activity Database and that there is no theoretical end to having ever higher order users. For example in an audit, including preparer Activities permits higher order users, such as supervisors and reviewers, to consider preparer Activities as part of each higher order user Documentation Database. Then, for example, an even higher order user may exist, such as a firm quality control reviewer, whose Activity Database would dynamically access a Documentation Database that includes the elements of the preparer's Documentation Database plus the Preparer's, Supervisor's and Reviewer's Activity Databases.

For example, higher level uses may include a Reviewer who reviews and approves a Preparer's work and results. The Documentation Database may include the Preparer's Actions and a Reviewer's Activity Database may be applied to an expanded Documentation Database.

An embodiment of the present invention is directed to supporting Higher Order Activities. For example, audit standards require proper supervision and review which may be facilitated by: providing a Documentation Database for the Higher Order Activities which includes audit preparer Activities, with those performed as of the time the Higher Order Activity determination appropriately noted and also providing a Higher Order Activity Database specific to the user's role (such as supervisor or reviewer), structured by rulesets specific to that role.

As shown in FIG. 8, Activity Data in the Documentation Database 810 for Higher Order Activities may include Activities subject to consideration by Higher Order Activities. Documentation Data may include Client Data 812, External Data 814, Previous Output Data 816 and Activity Database 820. The Activity Database 820 may further store and manage Activities in the form of Input, Action and Output.

Higher Order Activity Database 820 may manage one or more Higher Order Activities Database 830 which stores and manages User Activity, as shown by 832. User Activity 832 may receive inputs from Higher Order User Documentation Database 810 and further update based on Outputs from User Activity 832.

Figure 9:
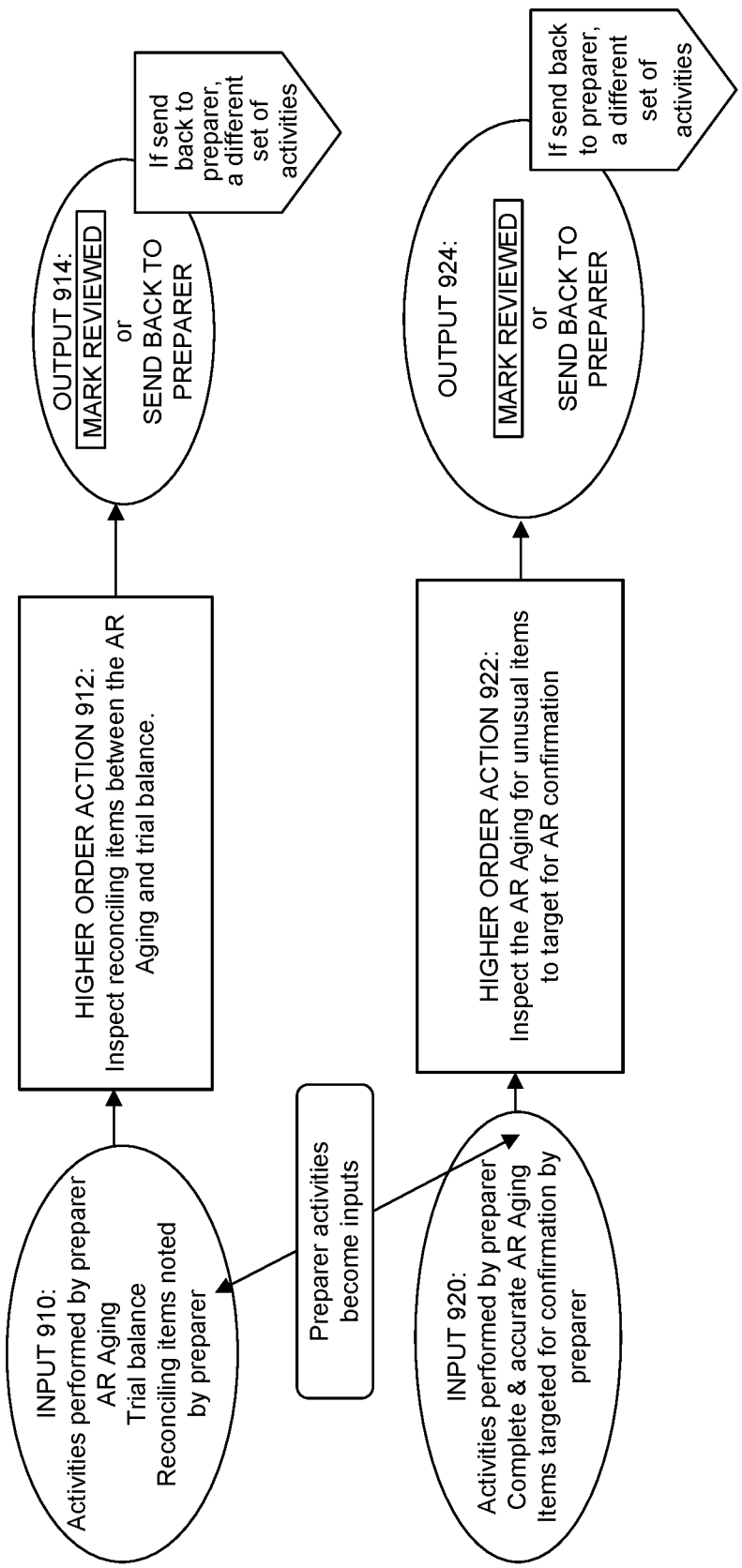
FIG. 9 is an illustrative example, according to an embodiment of the present invention.

FIG. 9 illustrates an illustrative example, according to an embodiment of the present invention.

As shown in FIG. 9, Input 910 may include Activities performed by preparer, AR aging, trial balance and reconciling items noted by preparer. Higher Order Action 912 may include: inspect reconciling items between the AR Aging and trial balance. Output 914 may include mark reviewed or send back to preparer. If sent back to preparer, a different set of activities may be performed. If marked reviewed, the process proceeds to Input 920.

Input 920 may include: activities performed by preparer; complete and accurate AR aging; and items targeted for confirmation by preparer. As shown in FIG. 9, preparer activities may become inputs. Action 922 may include: inspect the AR aging for unusual items to target for AR confirmation. Output 924 may include: mark reviewed or send back to preparer. If sent back to preparer, a different set of activities may be performed. If marked reviewed, the process proceeds to Input 920.

With current systems, a reviewer reviews the same procedures performed by the preparer and the documentation provided by the preparer. The same "review" report is used for every reviewer on every audit.

With an embodiment of the present invention, Higher Order Activities transform preparer Activities into data (inputs) that provide for a more efficient and effective review. Higher Order Activities are dynamic and unique to each audit.

Figure 10:
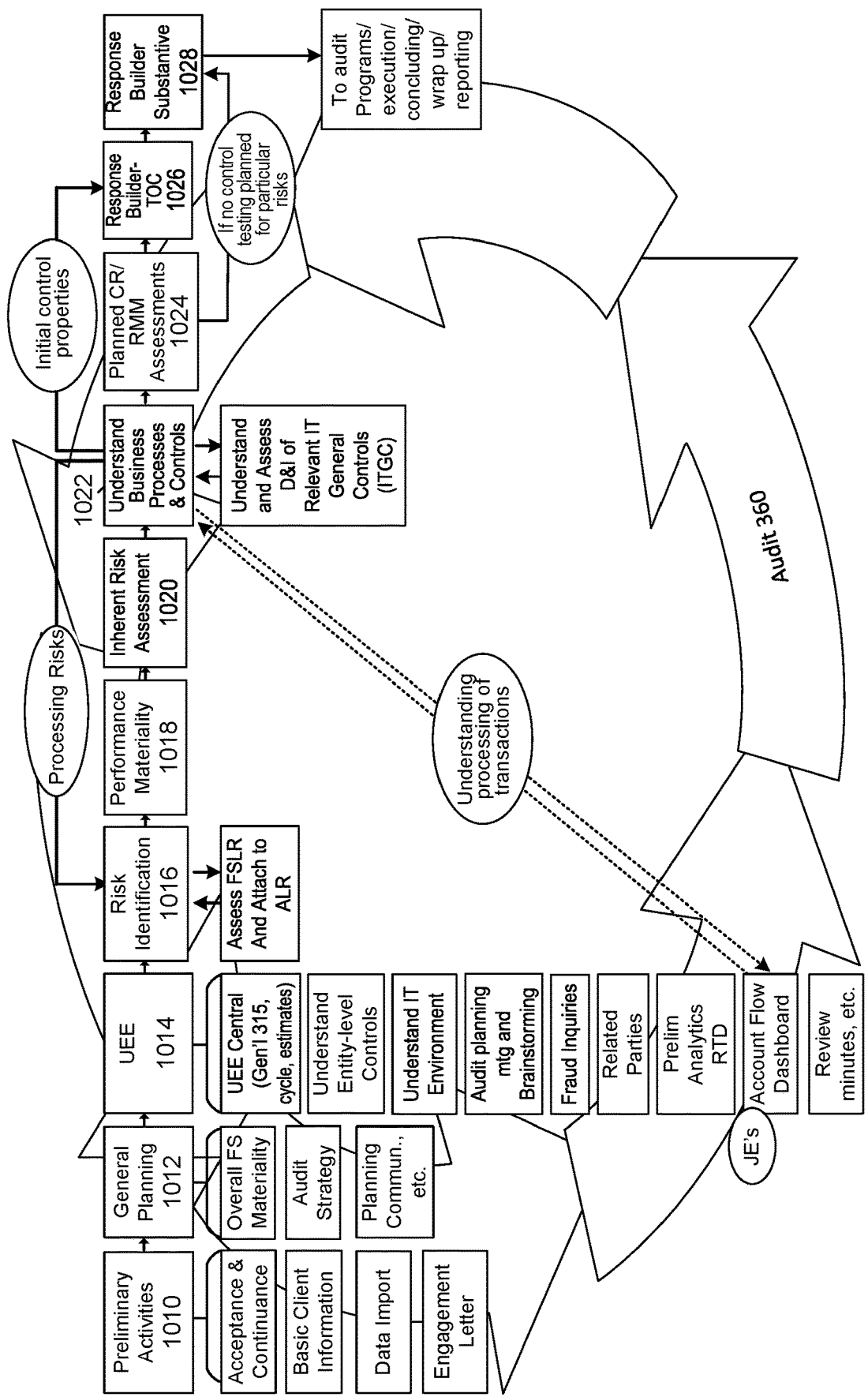
FIG. 10 is an exemplary dynamic workflow, according to an embodiment of the present invention.

FIG. 10 is an exemplary dynamic workflow, according to an embodiment of the present invention, according to an embodiment of the present invention.

More specifically, FIG. 10 illustrates the dynamic and iterative nature of a representative workflow. The iterative nature of the workflow may be captured in this illustration through the concept of "Audit 360". Audit 360 represents a process for revising the audit plan/strategy and/or risk assessment and considering the need to modify procedures to be performed whenever an audit matter is encountered. When an audit result is inconsistent with the audit strategy and/or plan or when new information is learned about the client, Audit 360 provides a structured approach for determining whether the result requires a change in the audit plan and/or strategy. Accordingly, Audit 360 also encompasses concomitant changes in communications with management and Those Charged With Governance (TCWG).

As shown in FIG. 10, Preliminary Activities 1010 may include Acceptance and Continuance, Basic Client Information, Data Import and Engagement Letter. General Planning 1012 may include Overall Financial Statement (FS) Materiality, Audit Strategy and Planning, etc. Understanding the Entity and its Environment (UEE) 1014 may include UEE Central, an understanding of entity level controls, an understanding of IT environment, audit planning meetings and brainstorming, fraud inquiries, related parties, preliminary analytics, account flow dashboard, review minutes, etc.

UEE may represent a collection of information used by an auditor to aid in risk identification and assessment. UEE is not intended to reference one particular risk assessment procedure or activity but, instead, various types of activities that support understanding the entity.

An account flow dashboard may provide an understanding of processing of transactions. According to an embodiment of the present invention, the account flow dashboard visually represents how transactions flow in the general ledger. Users may use this dashboard to focus on certain cycles and/or areas that are considered riskier and view the count of transactions and volume of activity that flows through a particular document type.

Risk Identification 1016 may involve assessing financial statement level risk (FSLR) and attaching to assertion level risks (ALR). Processing risks may further involve: Performance Materiality 1018, Inherent Risk Assessment 1020 and Understanding business processes and controls 1022 which may involve understanding and assessing Design and Implementation (D&I) of relevant IT general controls (ITGCs).

Initial Control Properties may involve understanding business processes and controls, as shown by 1022; Planned control risk/risk of material misstatement (CR/RMM) assessments 1024; Response Builder tests of controls (TOC) 1026 and Response builder substantive 1028, which may lead to audit programs, execution, concluding, wrap up and reporting.

Figure 11:
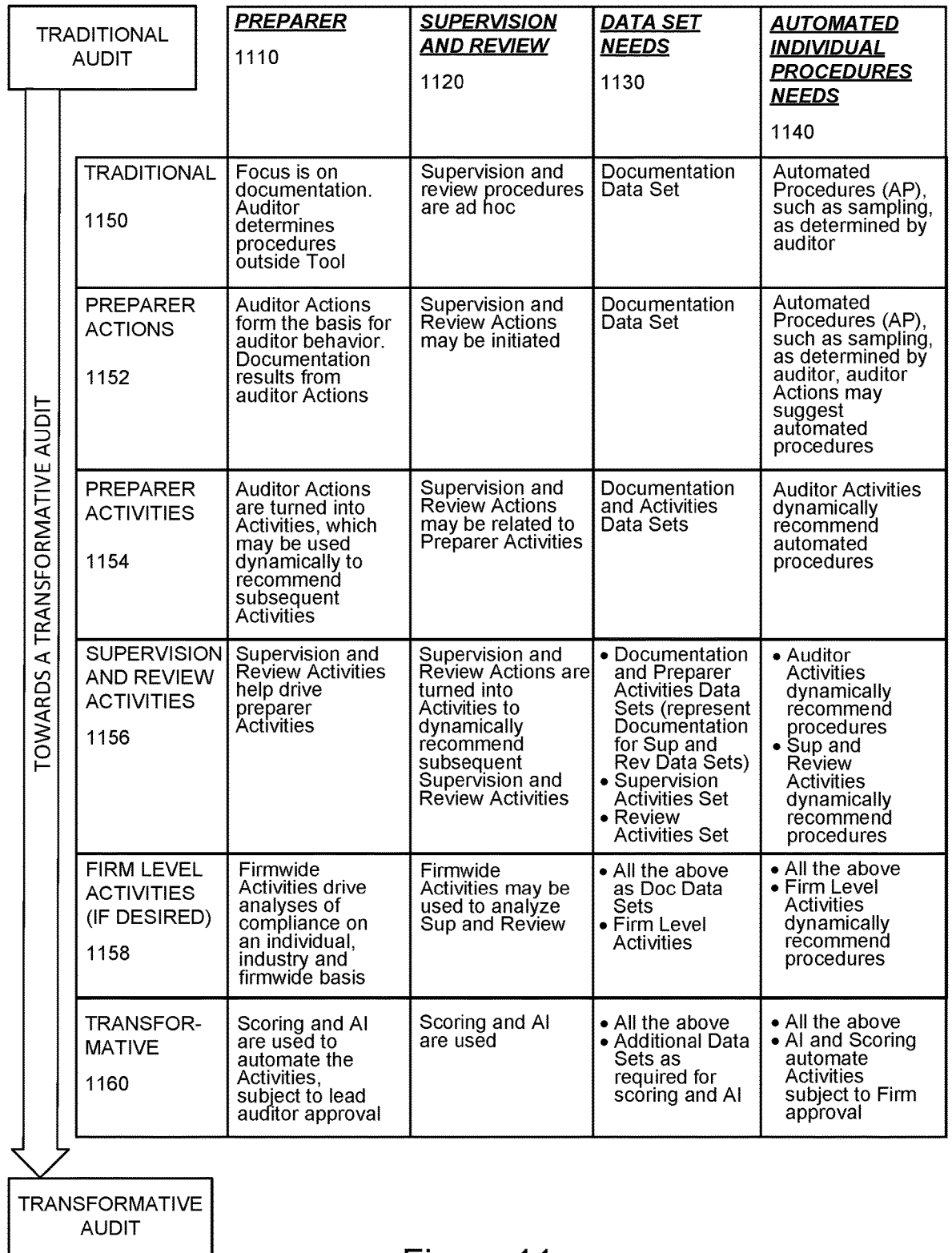
FIG. 11 illustrates a strategic progression, according to an embodiment of the present invention.

FIG. 11 illustrates a strategic progression, according to an embodiment of the present invention. More specifically, FIG. 11 illustrates the progression towards a transformative Dynamic Audit Solution. A comparison of functions and needs relating to Preparer 1110, Supervision and Review 1120, Data Set Needs 1130 and Automated Individual Procedures Needs 1140 is illustrated against this progression, moving from Traditional 1150 to Transformative 1160 through the addition over time of Preparer Actions 1152, Preparer Activities 1154, Supervision and Review Activities 1156, and Firm Level Activities 1158.

An embodiment of the present invention is directed to building and advancing audit technology with data at the center on a cloud-based, modern platform. An embodiment of the present invention seeks to deliver data analytics as an inherent part the tool's audit process, while also delivering reports, letters, engagement management and client collaboration.

An embodiment of the present invention supports information gathering, understanding the entity and environment, risk identification, materiality, and internal controls, risk and risk response libraries with a suggestion engine that leverages risk indicators, general ledger (GL) analytics and journal entry (JE) testing. A focus is on identification of individual risks and connecting the work being done at different points in the audit.

An embodiment of the present invention supports transformational audit with support for audits of more complex entities; including interim balances, group audit, preliminary review, expanded analytic (General Ledger and Sub Ledger), preliminary industry content and Migration/Integration/API capabilities.

An embodiment of the present invention supports the transformative audit with: expanded suggestion capabilities; enhanced reviewer capabilities; deeper use of data; scoring and use of Artificial Intelligence/Machine Learning; fuller industry content; and additional APIs.

An embodiment of the present invention further supports heavy data use and expanding connections through the audit.

Additional features may include: follows data-driven approach; captures and reuses structured information/data (engagement and client data); includes identification, assessment, and responses to risks at the individual risk level (no "canned" audit programs); includes linkage between understanding of the entity, risks, controls, and responses; links and responds to FS level risks at the individual risk level; follows top-down approach to understanding the entity and its environment and captures information about the entity in a more structured way and uses, or repurposes, that information to inform other actions such as risk identification (through the use of risk indicators); includes built-in linkages and libraries to support risk identification and development of responses; includes RMM model that is on a spectrum to drive towards future scoring of risks, procedures, and evidence; includes built in process and tools to assist with identifying and assessing relevance and reliability of source documents, follows Committee of Sponsoring Organizations (COSO) Internal Control—Integrated Framework as it applies to external financial statement reporting for internal control work and uses actions-based approach to process and control understanding.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be used in conjunction with the operation of the system and method of the invention. Rather, any number of different programming languages may be used as is necessary or desirable.

Also, the instructions and/or data used in the practice of various embodiments of the invention may use any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be used to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided using one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a data-driven, risk and activity-based dynamic audit application, the system comprising:
    an interface that communicates with one or more users via a communication network;
    an Activity Database that stores and manages one or more Activities wherein each Activity comprises an Input, an Action and an Output;
    a Documentation Database that stores and manages client data, external data and previous output data wherein the Documentation Database and the Activity Database are linked in a manner where the Input of the Activity is based on data from the Documentation Database and the Output of the Activity is used to update the Documentation Database;
    a Risk/Response Library Database that stores and manages standard risks, risk groups, risk responses and control objectives; and
    a computer processor coupled to the interface, the Activity Database and the Documentation Database, the Risk/Response Library Database and further configured to perform the steps of:
        performing an initial action that generates a corresponding one or more outputs wherein the initial action is part of an audit engagement;
        based on the corresponding one or more outputs, dynamically generating a set of activity options;
        for each activity option, determining a score that represents a relative ranking against other activity options;
        from the set of activity options and based at least in part on the score, identifying an optimal activity;
        performing a next action that comprises the optimal activity;
        generating a set of procedures specific to the audit engagement; and
        identifying one or more relevant risks derived from one or more risk indicators within the Risk/Response Library Database based on the one or more outputs of the initial action and at least one output of the next action.

2. The system of claim 1, wherein the Action comprises one or more of: Inspection, Observation, Confirmation, Recalculation, Reperformance, Analytical Procedure, Inquiry, Concluding, Evaluating and Measuring.

3. The system of claim 1, wherein the Action is developed by: determining one or more inputs necessary to complete the Action, determining one or more outputs and how the one or more outputs are subsequently used.

4. The system of claim 1, wherein the set of procedures are used to generate an audit report.

5. The system of claim 1, wherein the set of activity options comprise one or more Activity Groups based on the type of evidence each Activity is designed to elicit.

6. The system of claim 1, wherein the score comprises an object score where an object represents a matter to resolve or a goal of the Activity and the object score represents a measure of evidence sufficiency in resolving the object.

7. The system of claim 6, wherein the object comprises a set of attributes relating to evidence needed to satisfy each attribute and evidence accumulated.

8. The system of claim 7, wherein the set of attributes comprises: personnel availability, time to complete, completion date, and availability of inputs.

9. The system of claim 1, wherein the optimal activity is based on ranking the set of activity options by an efficiency determination.

10. The system of claim 1, further comprising a higher order user documentation database that comprises an Activity Database.

11. The system of claim 1, wherein the computer processor is further configured to perform the steps of:
storing and managing, via the Risk/Response Library Database, one or more standard risks, risk response procedures, risk groups and/or control objectives;
generating one or more risk indicators that uses as inputs the outputs of one or more audit activities that have been performed for the audit engagement;
generating one or more suggested risks from the Risk/Response Library Database using a predefined or system-learned linkage from the one or more risks indicators to one or more items in the Risk/Response Library Database; and
generating one or more suggested risk response procedures from the Risk/Response Library Database using a predefined or system-learned linkage from the one or more risks added to the audit engagement to one or more items in the Risk/Response Library Database.

12. A method that implements a data-driven, risk and activity-based dynamic audit application, the method comprising the steps of:
storing and managing, via an Activity Database, one or more Activities wherein each Activity comprises an Input, an Action and an Output;
storing and managing, via a Documentation Database, client data, external data and previous output data wherein the Documentation Database and the Activity Database are linked in a manner where the Input of the Activity is based on data from the Documentation Database and the Output of the Activity is used to update the Documentation Database;
storing and managing, via a Risk/Response Library Database, standard risks, risk groups, risk responses and control objectives;
performing, via a computer processor, an initial action that generates a corresponding one or more outputs wherein the initial action is part of an audit engagement;
based on the corresponding one or more outputs, dynamically generating, via the computer processor, a set of activity options;
for each activity option, determining, via a scoring engine, a score that represents a relative ranking against other activity options;
from the set of activity options and based at least in part on the score, identifying, via the computer processor, an optimal activity;
performing, via the computer processor, a next action that comprises the optimal activity;
generating, via the computer processor, a set of procedures specific to the audit engagement; and
identifying, via the computer processor, one or more relevant risks derived from one or more risk indicators within the Risk/Response Library Database based on the one or more outputs of the initial action and at least one output of the next action.

13. The method of claim 12, wherein the Action comprises one or more of: Inspection, Observation, Confirmation, Recalculation, Reperformance, Analytical Procedure, Inquiry, Concluding, Evaluating and Measuring.

14. The method of claim 12, wherein the Action is developed by: determining one or more inputs necessary to complete the Action, determining one or more outputs and how the one or more outputs are subsequently used.

15. The method of claim 12, wherein the set of procedures are used to generate an audit report.

16. The method of claim 12, wherein the set of activity options comprise one or more Activity Groups based on the type of evidence each Activity is designed to elicit.

17. The method of claim 12, wherein the score comprises an object score where an object represents a matter to resolve or a goal of the Activity and the object score represents a measure of evidence sufficiency in resolving the object.

18. The method of claim 17, wherein the object comprises a set of attributes relating to evidence needed to satisfy each attribute and evidence accumulated.

19. The method of claim 18, wherein the set of attributes comprises: personnel availability, time to complete, completion date, and availability of inputs.

20. The method of claim 12, wherein the optimal activity is based on ranking the set of activity options by an efficiency determination.

21. The method of claim 12, further comprising the step of: providing a higher order user documentation database that comprises an Activity Database and interacts with a Higher Order Activity Database.

22. The method of claim 12, further comprising the steps of:
storing and managing, via the Risk/Response Library Database, one or more standard risks, risk response procedures, risk groups and/or control objectives;
generating, via the computer processor, one or more risk indicators that uses as inputs the outputs of one or more audit activities that have been performed for the audit engagement;
generating, via the computer processor, one or more suggested risks from the Risk/Response Library Database using a predefined or system-learned linkage from the one or more risks indicators to one or more items in the Risk/Response Library Database; and
generating, via a computer processor, one or more suggested risk response procedures from the Risk/Response Library Database using a predefined or system-learned linkage from the one or more risks added to the audit engagement to one or more items in the Risk/Response Library Database.

\* \* \* \* \*